(12) United States Patent
Nelson et al.

(10) Patent No.: US 7,035,838 B2
(45) Date of Patent: Apr. 25, 2006

(54) METHODS AND SYSTEMS FOR ORGANIZING INFORMATION STORED WITHIN A COMPUTER NETWORK-BASED SYSTEM

(75) Inventors: William C. Nelson, Hamden, CT (US); Sukhminder Grewal, New Haven, CT (US)

(73) Assignee: General Electric Company, Schenectady, NY (US)

( * ) Notice: Subject to any disclaimer, the term of this patent is extended or adjusted under 35 U.S.C. 154(b) by 449 days.

(21) Appl. No.: 10/313,079

(22) Filed: Dec. 6, 2002

(65) Prior Publication Data

US 2004/0111387 A1 Jun. 10, 2004

(51) Int. Cl.
*G06F 17/30* (2006.01)

(52) U.S. Cl. .................. 707/1; 707/3; 707/10; 707/101; 707/102; 707/104.1; 709/201; 709/204; 709/217; 709/224

(58) Field of Classification Search ................ 707/3–6, 707/9, 10, 102, 104.1, 1, 101; 709/201–204, 709/216, 217, 224
See application file for complete search history.

(56) References Cited

U.S. PATENT DOCUMENTS

| | | | |
|---|---|---|---|
| 5,630,125 A | | 5/1997 | Zellweger |
| 5,708,825 A | * | 1/1998 | Sotomayor ................ 715/501.1 |
| 5,845,062 A | * | 12/1998 | Branton et al. ................ 714/25 |
| 5,884,035 A | * | 3/1999 | Butman et al. ............. 709/218 |
| 5,930,474 A | | 7/1999 | Dunworth et al. |
| 6,046,742 A | * | 4/2000 | Chari ......................... 715/734 |
| 6,078,924 A | | 6/2000 | Ainsbury et al. |
| 6,151,601 A | | 11/2000 | Papierniak et al. |
| 6,166,739 A | | 12/2000 | Hugh |
| 6,233,575 B1 | | 5/2001 | Agrawal et al. |
| 6,256,032 B1 | | 7/2001 | Hugh |
| 6,289,348 B1 | * | 9/2001 | Richard et al. ............... 707/10 |
| 6,446,061 B1 | | 9/2002 | Doerre et al. |
| 6,482,012 B1 | * | 11/2002 | Nocera et al. ............. 434/236 |
| 6,594,654 B1 | * | 7/2003 | Salam et al. .................... 707/3 |
| 6,859,807 B1 | * | 2/2005 | Knight et al. ................. 707/10 |
| 6,873,981 B1 | * | 3/2005 | Nareddy et al. ............... 707/3 |

* cited by examiner

*Primary Examiner*—Jeffrey Gaffin
*Assistant Examiner*—Jacques Veillard
(74) *Attorney, Agent, or Firm*—Armstrong Teasdale LLP

(57) ABSTRACT

A method for organizing information stored within a computer network-based system that includes a server system is provided. The server system is coupled to a centralized database and at least one client system. The method includes receiving at the server system information from the client system wherein the information includes documentation relating to a plurality of topics and a list of experts on a plurality of topics, storing information received at the server system in the centralized database, organizing the information stored in the centralized database, aggregating related information by at least one of a work function, a functional category, and a community, and displaying a user interface on the client system to enable a user to search the database for a specific item of information by at least one of the work function, the functional category, and the community.

29 Claims, 27 Drawing Sheets

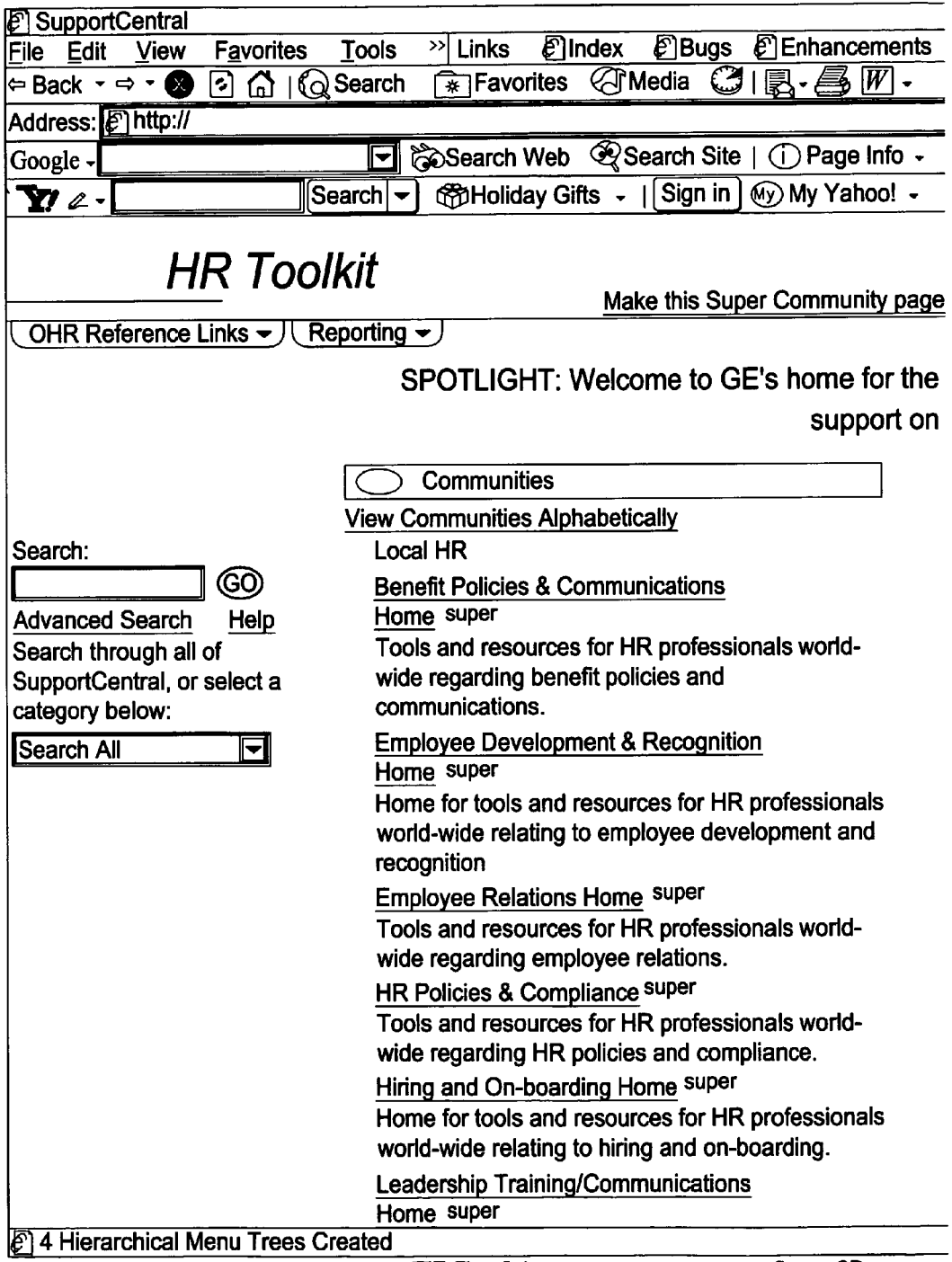
FIG. 6A        figure 6B → figure 7B →

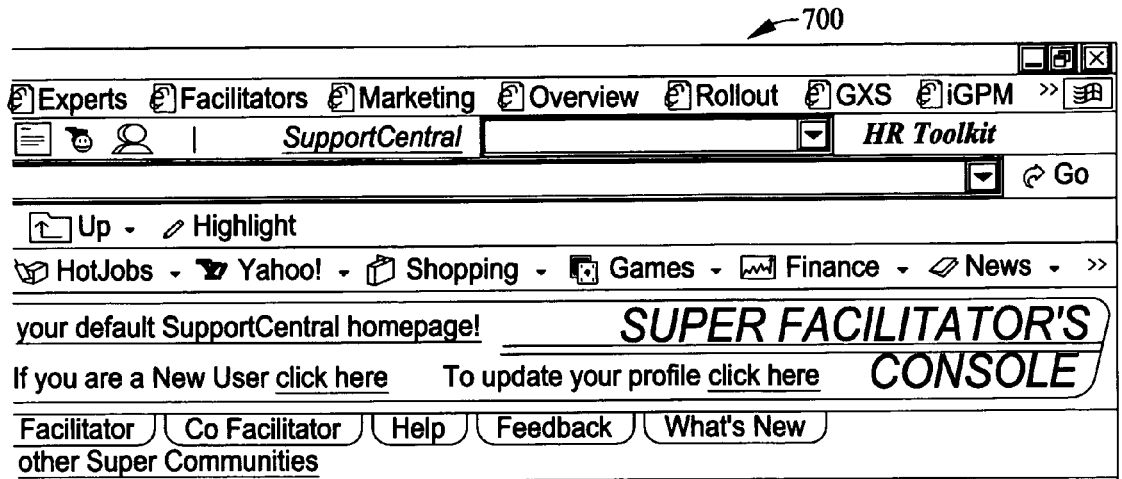
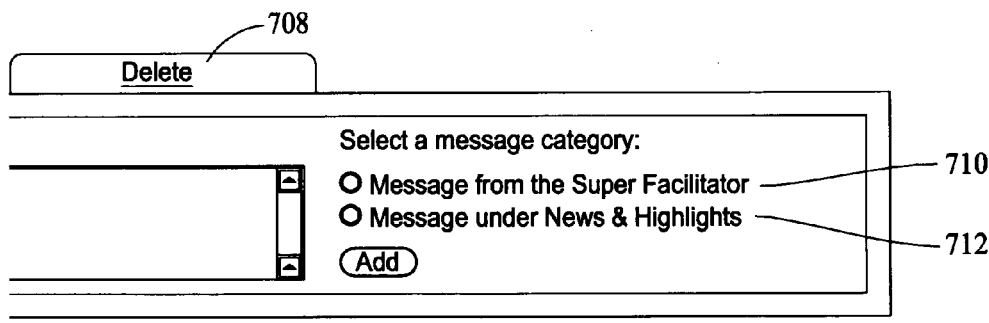
FIG. 8B

← 740

```
http://supportcentral
File  Edit  View  Favorites  Tools  »  Links  Index  Bugs  Enhancements
← Back ▼ ⇒ ▼ ⊗  ⟲ ⌂ | Search  *Favorites  Media  ⊙ | ▤▾ ⎙ W ▾
Address: http://
Google ▾ [                    ] ▾  Search Web  Search Site | ⓘ Page Info ▾
Y! ℯ ▾ [              ] Search ▾  Holiday Gifts ▾ | Sign in  My Yahoo! ▾
```

SupportCentral
*Share Knowledge, Find Answers*

Hello Wil    Make this page
If you are not Wil Nelson click here

| Home | Administrator | DBA | My Cases | Expert | Super Facilitator |

Go to SUPPORTCENTRAL SUPER COMMUNITY    Click here to select

Document Management
 Add
 Update/Delete
 Push Document
 Push Tab
 Push Survey
 Add/Edit Messages

Super Community Management
 Nominate Experts
 View Experts' Schedules
 Create New Community
 Add/Edit a Community
 View New Communities
 Manage Chief Facilitators
 Manage Comm. Performance
 Manage Community Categories
 Apply Secured Groups
 Update Security List
 Email Communities
 Create Welcome Page
 Manage Community View

Push Survey

The Push function allows you to push a Survey onto Communities listed under Super Community, at the 2. Click one of the 'SupportCentral Development (Click here to open the Community in a new window,
Note: Books, Domino.Doc Documents, File

• Manuals  • FAQs

○ Wil's Test Survey

4. Choose a Content Category to push the Survey to:

○ Fundamentals  ○ Training  ○ Process  ○ Best Tools  ○ Quick Tips  ○ Manuals  ○ People / Org my comments  ○ my  ○ a  ○ b  ○ Action Item Links  ○ My global links  ○ Policies  ○ Reports Financial Planning & Analysis  ○ BD Finance Accounting  ○ P & L Finance  ○ Forms  ○ Approval Help  ○ Surveys  ○ Customer Info  ○ Dashboards/ ○ Dashboards/Metrics  ○ Dashboards/Metrics FIG. 9A    figure 9B ⟶

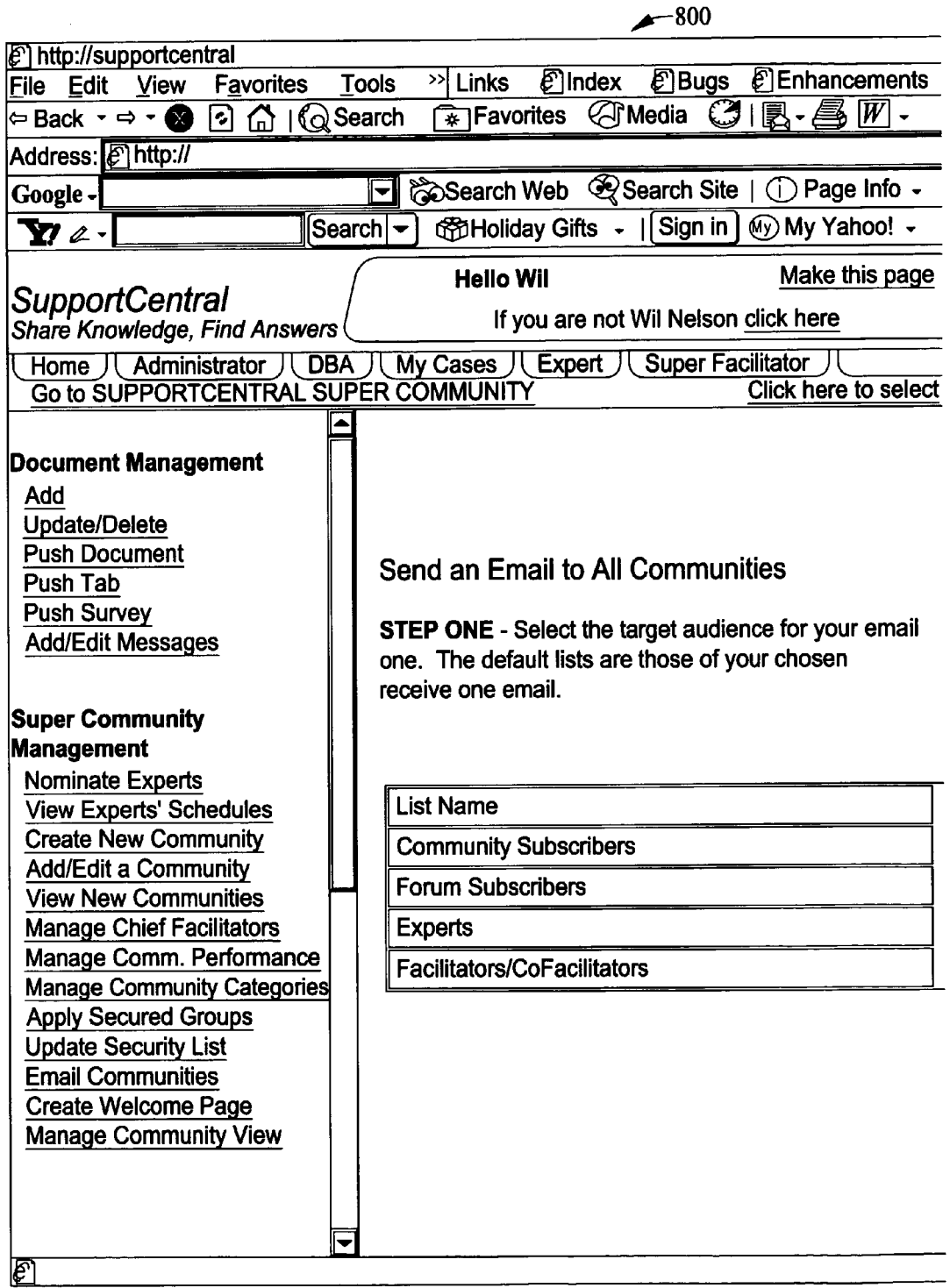
FIG. 11A figure 11B →

*800

| Experts | Facilitators | Marketing | Overview | Rollout | GXS | iGPM | » |

SupportCentral | | HR Toolkit

| | Go

Up ▾ / Highlight

HotJobs ▾ Yahoo! ▾ Shopping ▾ Games ▾ Finance ▾ News ▾ » your default SupportCentral homepage!  SUPER FACILITATOR'S
If you are a New User click here   To update your profile click here  CONSOLE

Facilitator | Co Facilitator | Help | Feedback | What's New
other Super Communities

| 1. Select Target Audience | 2. Add My Lists | 3. Send Message from 'Default Community Lists'. Note, you can select more than
communities only. Anyone over-lapping in more than one list will only

Default Community Lists

| List Description | List Type | Date Created | Select List |
|---|---|---|---|
| This is Community Subscriber list. | Shared | - | ☐ |
| This is Forum Subscriber list. | Shared | - | ☐ |
| This is Expert list. | Shared | - | ☐ |
| This is Facilitators and CoFacilitators List. | Shared | - | ☐ |

[ Continue to Next Step ]   [ Skip to Step 3 ]

◯ Internet

← figure 11A    FIG. 11B

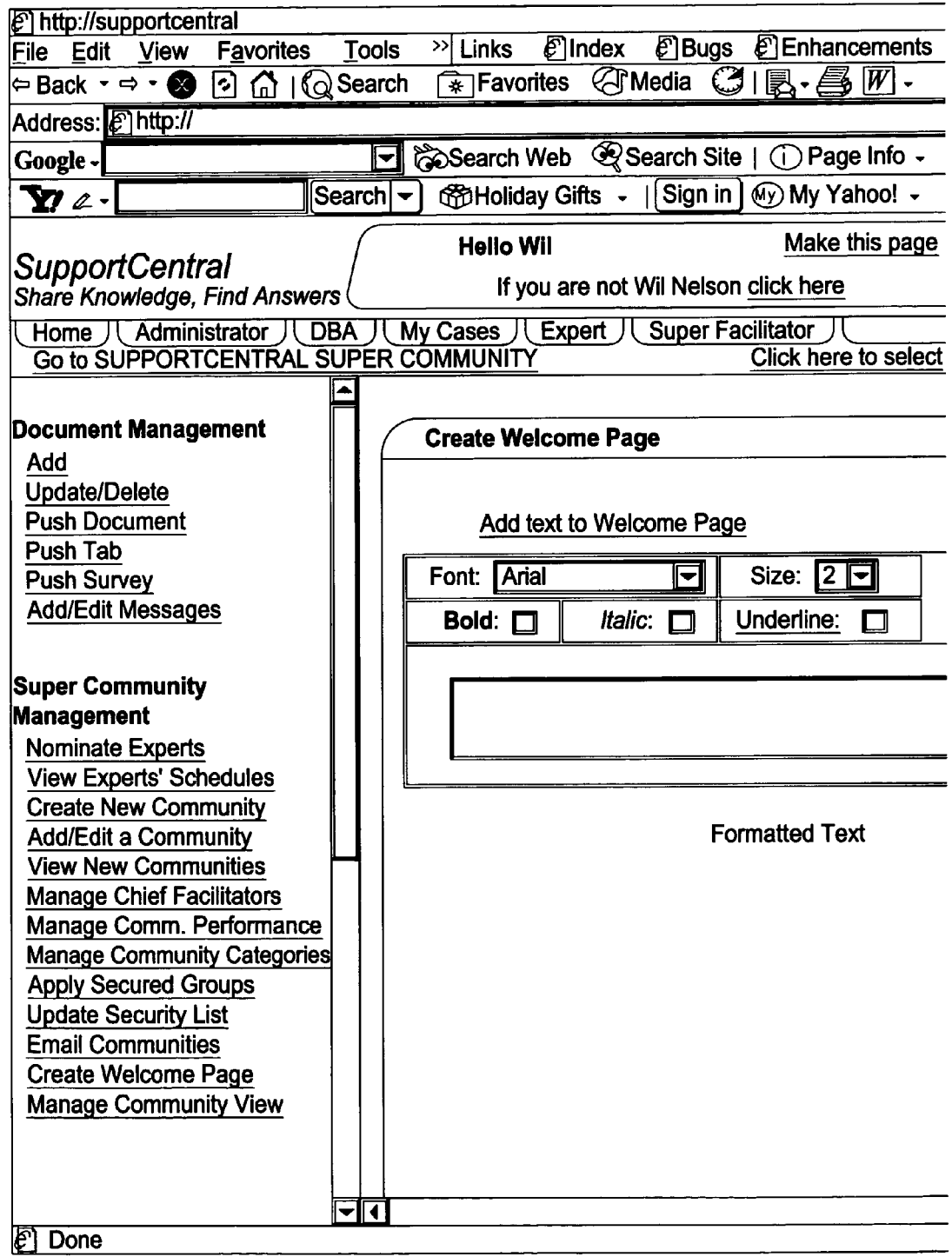
FIG. 12A figure 12B →

← 860

```
http://supportcentral
File  Edit  View  Favorites  Tools  »| Links  Index  Bugs  Enhancements
← Back ▾ ⇒ ▾ ⊗  ⊙ ⌂ | Search   Favorites  Media  ⊙ | ▤ ▾ ⊜  W ▾
Address: http://
Google ▾ [                    ▼]  Search Web   Search Site  |  ⓘ Page Info ▾
Y! ℓ ▾ [             ] Search ▾  Holiday Gifts ▾ | Sign in  My Yahoo! ▾
```

SupportCentral        Hello Wil                    Make this page
Share Knowledge, Find Answers   If you are not Wil Nelson click here

| Home | Administrator | DBA | My Cases | Expert | Super Facilitator |
Go to SUPPORTCENTRAL SUPER COMMUNITY      Click here to select

Document Management
Add
Update/Delete
Push Document
Push Tab
Push Survey
Add/Edit Messages

Super Community Management
Nominate Experts
View Experts' Schedules
Create New Community
Add/Edit a Community
View New Communities
Manage Chief Facilitators
Manage Comm. Performance
Manage Community Categories
Apply Secured Groups
Update Security List
Email Communities
Create Welcome Page
Manage Community View

SUPPORTCENTRAL SUPER

This Report gives
You can send Email to Facilitator

Page 1 of 1

| Community Type | Comm. Creation Date | Community Name(ID) |
|---|---|---|
| Global | 17-JAN-02 | SupportCentral Overview; |
| Global | 20-JUN-01 | SupportCentral NT FileServer |
| Global | 11-AUG-00 | Supportsoft (221) |
| Global | 31-OCT-01 | SupportCentral Rollout |
| Global | 04-OCT-00 | SupportCentral |
| Global | 19-APR-01 | Taking, Hosting & Creating |
| Global | 15-SEP-00 | SupportCentral Bugs (409) |
| Global | 01-MAR-01 | SupportCentral Overview; |

Done

| http://supportcentral | | | | | | | |
|---|---|---|---|---|---|---|---|
| File | Edit | View | Favorites | Tools | » Links | Index Bugs | Enhancements |

← Back ▾ ⇒ ▾ ⊗ | ⌂ | Search | Favorites | Media | ...

Address: http://

Google ▾ [   ] ▾ | Search Web  Search Site | ⓘ Page Info ▾

Y! ✎ ▾ [   ] Search ▾ | Holiday Gifts ▾ | Sign in | My Yahoo! ▾

SupportCentral
Share Knowledge, Find Answers

Hello Wil                          Make this page
If you are not Wil Nelson click here

| Home | Administrator | DBA | My Cases | Expert | Super Facilitator |
Go to SUPPORTCENTRAL SUPER COMMUNITY          Click here to select View Experts' Schedules
Create New Community
Add/Edit a Community
View New Communities
Manage Chief Facilitators
Manage Comm. Performance
Manage Community Categories
Apply Secured Groups
Update Security List
Email Communities
Create Welcome Page
Manage Community View 884   882
Reports
Cumulative Community Reports
Monthly Community Reports
Community Feedback
Cases Overall Report
WorkFlow Form Status
Case Status
VOC
Projects
Export Cases to Excel Cumulative Community Report Page 1 of 1

| Community Type | Community Name(ID) |
|---|---|
| Global | SupportCentral Administrators |
| Global | SupportCentral Bugs (409) |
| GE Corporate | SupportCentral Development Team |
| Global | SupportCentral Enhancements |
| Global | SupportCentral Marketing (241) |
| Global | SupportCentral NT FileServer |
| Global | SupportCentral Overview; |
| Global | SupportCentral Overview; Experts |

Done

FIG. 15A                figure 15B ⟶

- SUPPORTCENTRAL SUPER COMMUNITY      [Export to Excel]

[Generate Report]

| | Total Number of Visits (R<5,G=<50,B>50) | Facilitator Visits (R<5,G=<50,B>50) | Expert Visits (R<5,G |
|---|---|---|---|
| (405) | 4930 | 148 | 1028 |
| | 10167 | 524 | 3998 |
| (4025) | 1828 | 211 | 1483 |
| (13205) | 11032 | 1380 | 2651 |
| | 14442 | 510 | 3621 |
| (10725) | 1836 | 479 | 628 |
| Community Basics (82) | 42378 | 1255 | 4626 |
| (3465) | 10193 | 35 | 1066 |

← figure 15A     FIG. 15B

METHODS AND SYSTEMS FOR ORGANIZING INFORMATION STORED WITHIN A COMPUTER NETWORK-BASED SYSTEM

BACKGROUND OF THE INVENTION

This invention relates generally to computer network-based systems and more particularly to organizing information stored within such computer network-based systems.

Organizing information stored within a computer network-based system to identify relevant information, or individuals having expertise, on a specific subject can be tedious and time consuming, especially in systems having numerous databases storing vast amounts of information, such as a computer network-based system commonly used by business entities referred to as an intranet. Organizing information on these types of networks and systems can also be inefficient, and may result in inadvertently grouping information that is not relevant to a specific subject, or may result in the creation of a plurality of small groups of information which may make locating a relevant group of information difficult.

For example, items of information included on an entity's intranet are typically stored and searched for with an online community definition. Online community definitions are typically specific in describing the topic for which the information item relates. Information items relating to similar topics, however, are not typically aggregated. Therefore, when a user is attempting to locate an item of information or an expert in a specific topical area, a user performing a search on the intranet for a specific informational topic must scan the search results to attempt to view only those online community definitions that appear relevant. However, even a highly experienced user may have difficulty in locating only the relevant information items, and as such searching for relevant information items within the search list may be time consuming.

Similarly, it is also beneficial to organize information stored within a computer network-based system that is a wide area network commonly referred to as the Internet. The present invention can also be used to organize such information stored on the Internet.

BRIEF DESCRIPTION OF THE INVENTION

In one aspect, a method for organizing information stored within a computer network-based system that includes a server system is provided. The server system is coupled to a centralized database and at least one client system. The method includes receiving at the server system information from the client system wherein the information includes documentation relating to a plurality of topics and a list of experts on a plurality of topics, storing information received at the server system in the centralized database, organizing the information stored in the centralized database, aggregating related information by at least one of a work function, a functional category, and a community, and displaying a user interface on the client system to enable a user to search the database for a specific item of information by at least one of the work function, the functional category, and the community.

In another aspect, a network based system for organizing information stored within the system is provided. The system includes a client system comprising a browser, a centralized database for storing information, and a server system configured to be coupled to the client system and the database. The server system is further configured to receive information from the client system wherein the information includes documentation relating to a plurality of topics and a list of experts on a plurality of topics, store information in the centralized database, organize information stored in the centralized database, and aggregate related information by at least one of a work function, a functional category, and a community.

In another aspect, a computer program embodied on a computer readable medium for organizing information stored within a computer network-based system is provided. The program includes a code segment that receives information and then stores the information in a database. The information includes documentation relating to a plurality of topics and a list of experts relating to a plurality of topics. The program further includes a code segment that organizes information stored in the database, aggregates related information by at least one of a work function, a functional category, and a community, and displays a user interface on a client system to enable a user to search the database for a specific item of information by at least one of the work function, the functional category, and the community.

BRIEF DESCRIPTION OF THE DRAWINGS

FIGS. 6A and 6B show an example embodiment of a user interface of a SCS that displays a Human Resources Super Community home page in a "customized" mode.

FIGS. 7A and 7B show an example embodiment of a user interface of a SCS that displays an Add Documents/Links/News page.

FIGS. 8A and 8B show an example embodiment of a user interface of a SCS that displays an Add/Edit Message From Super Facilitator page.

FIGS. 9A and 9B show an example embodiment of a user interface of a SCS that displays a Push Surveys page.

FIGS. 11A and 11B show an example embodiment of a user interface of a SCS that displays a Send E-Mail to All Member Communities page.

FIGS. 12A and 12B show an example embodiment of a user interface of a SCS that displays a Create A Welcome page.

FIGS. 14A and 14B show an example embodiment of a user interface of a SCS that displays a Consolidated Community Reports page.

FIGS. 15A and 15B show an example embodiment of a user interface of a SCS that displays a Cumulative Community Report page.

DETAILED DESCRIPTION OF THE INVENTION

Methods and systems for organizing information stored within a computer system are described herein in the context of organizing information stored within a computer-based network, e.g., a wide area network, a local area network. The methods and systems, however, are not limited to organizing information on networks and can be utilized for organizing information in many other contexts. For example, the methods and systems can be utilized in organizing information stored within databases directly linked to a computer without requiring network access. Although the methods and systems are believed to be particularly useful in organizing information stored within large databases accessible via wide area networks and local area networks (e.g., an entity's intranet and the Internet), such systems and methods can be used in organizing information stored within many other types of data storage units.

The methods and systems for organizing information stored within a computer system are described herein as being implemented in connection with a web site that is accessible via a computer network system, including an entity's intranet. The example web site provides a single entry point through which individuals can seek information, support, training, and action. The web site also provides an integrated approach to providing internal users or customers with education, information and computer assisted or human help on a specific subject, problem or a project.

More specifically, at least one technical effect produced by the system, which is referred to herein as a Super Community System ("SCS"), includes enabling a user to organize information stored within a computer system by aggregating related communities into a single functional category. The functional categories may then be further organized into work functions, also known as "Super Communities". Additionally, the information may be laterally organized by at least one of business, sub-business, and/or office location.

Although the web site is described herein, the organization methods and systems are not limited to practice in connection with a web site nor a particular web site. Rather, such methods and systems can be implemented and practiced in connection with many other types of architectures.

The systems and processes are not limited to the specific embodiments described herein. In addition, components of each system and each process can be practiced independent and separate from other components and processes described herein. Each component and process can be used in combination with other components and processes.

Figure 1:
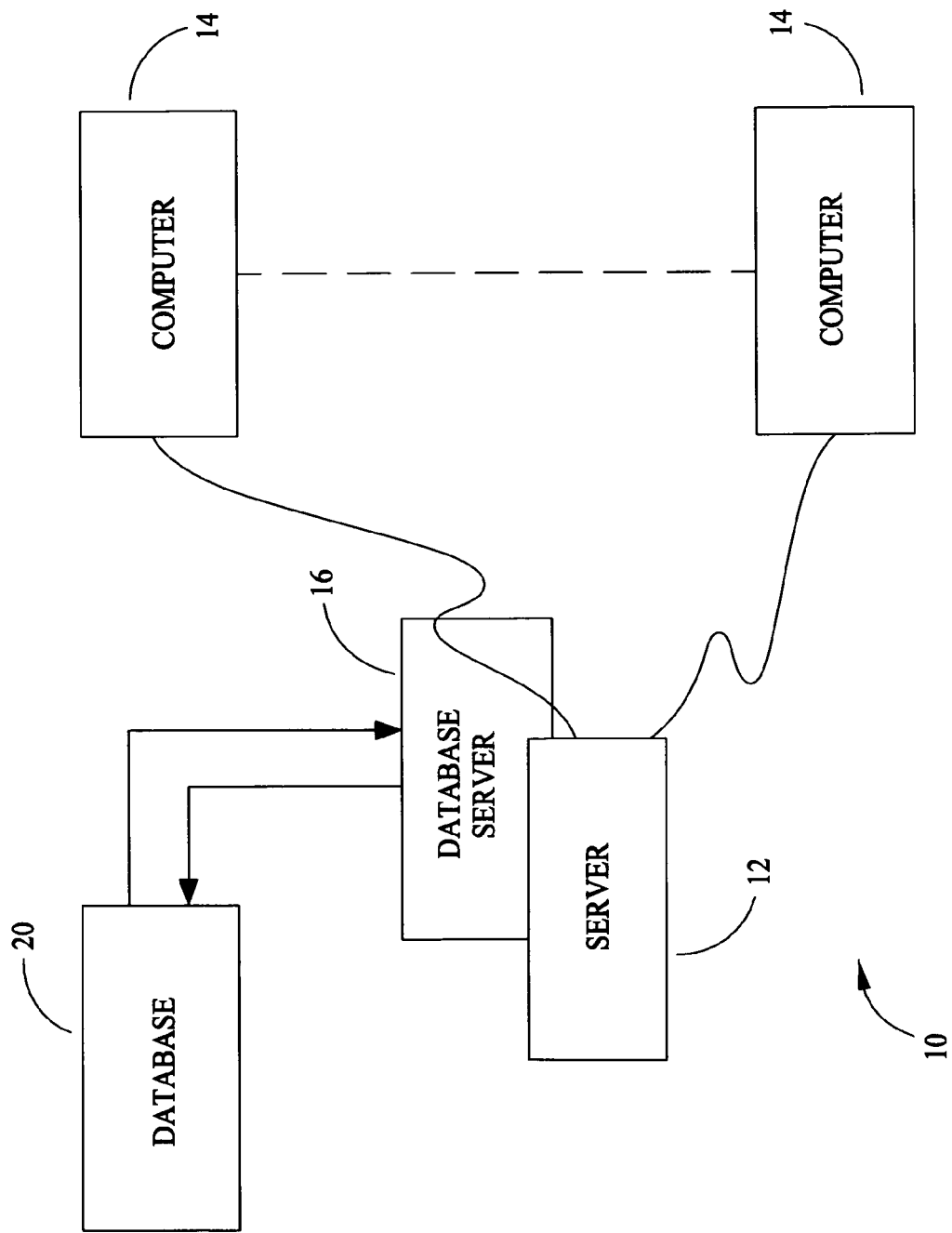
FIG. 1 is a simplified block diagram of a Super Community System (SCS) in accordance with one embodiment of the present invention.

FIG. 1 is a simplified block diagram of a Super Community System (SCS) 10 including a server system 12, and a plurality of client sub-systems, also referred to as client systems 14, connected to server system 12. In one embodiment, client systems 14 are computers including a web browser, such that server system 12 is accessible to client systems 14 via the Internet. Client systems 14 are interconnected to the Internet through many interfaces including a network, such as a local area network (LAN) or a wide area network (WAN), dial-in-connections, cable modems and special high-speed ISDN lines. Client systems 14 could be any device capable of interconnecting to the Internet including a web-based phone, personal digital assistant (PDA), or other web-based connectable equipment. A database server 16 is connected to a database 20 containing information on a variety of matters, as described below in greater detail. In one embodiment, centralized database 20 is stored on server system 12 and can be accessed by potential users at one of client systems 14 by logging onto server system 12 through one of client systems 14. In an alternative embodiment database 20 is stored remotely from server system 12 and may be non-centralized.

Figure 2:
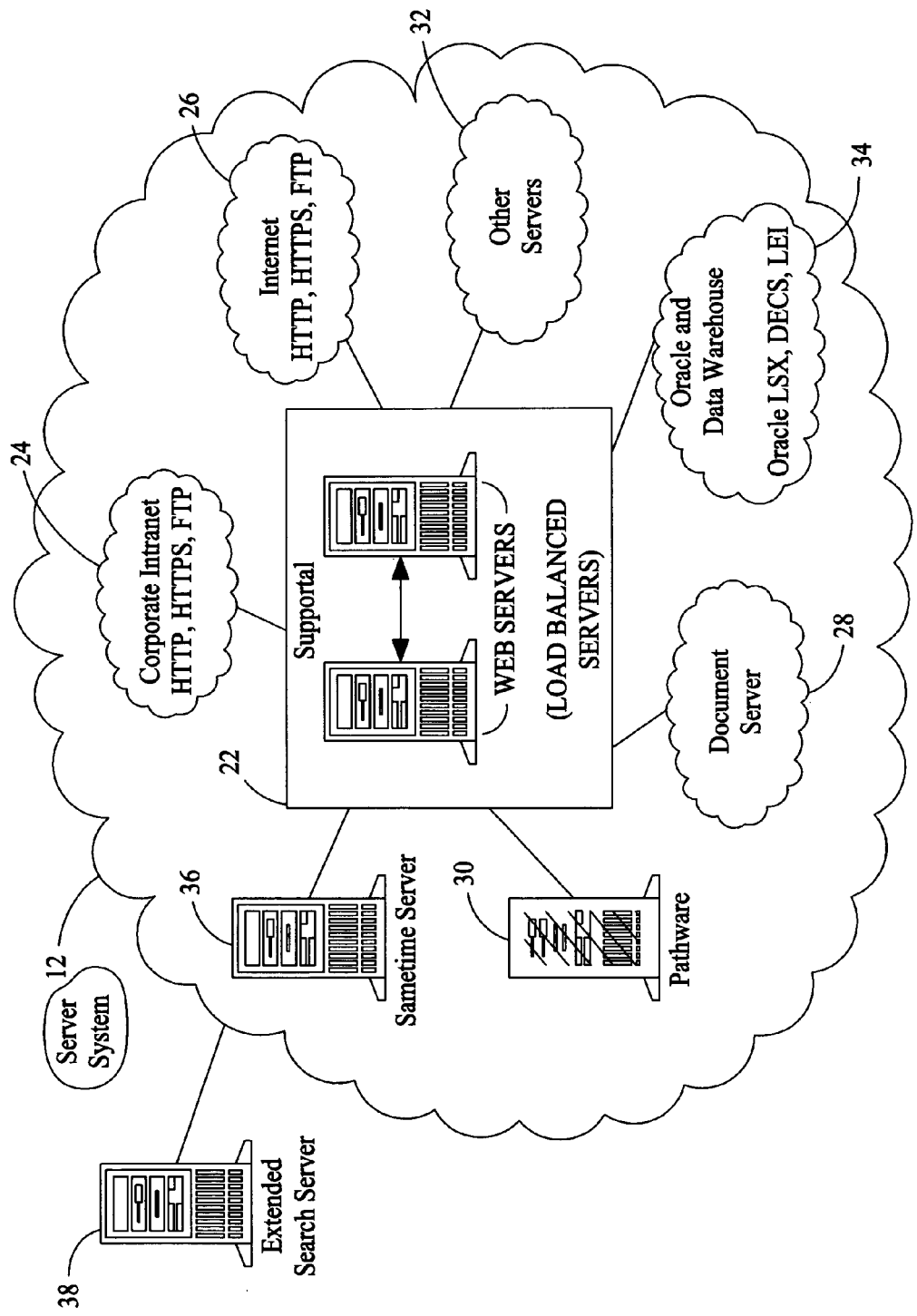
FIG. 2 is an expanded version block diagram of an example embodiment of a server system architecture of the SCS.

FIG. 2 is an overview of server system 12. Supportal 22, web servers which are load-balanced, facilitate the discovery of information. Information exists in many formats and in many locations. Using a variety of connection methods, Supportal 22 connects a user with the information. Supportal 22 can, for example, direct users to a corporate intranet 24, the Internet 26, document server 28, pathware server 30 and other types of servers 32. In addition, the server uses databases 34 such as Oracle LSX, LEI and DECS to exchange information with other databases. In addition, Supportal 22 also provides Instant Messaging, Chat Room and Webinar services by utilizing Sametime (or other "Chat" software) server 36. Server system 12 also includes an extended search server 38 for extended search to index content linked to Supportal 22 and to allow the user to search for information.

Figure 3:
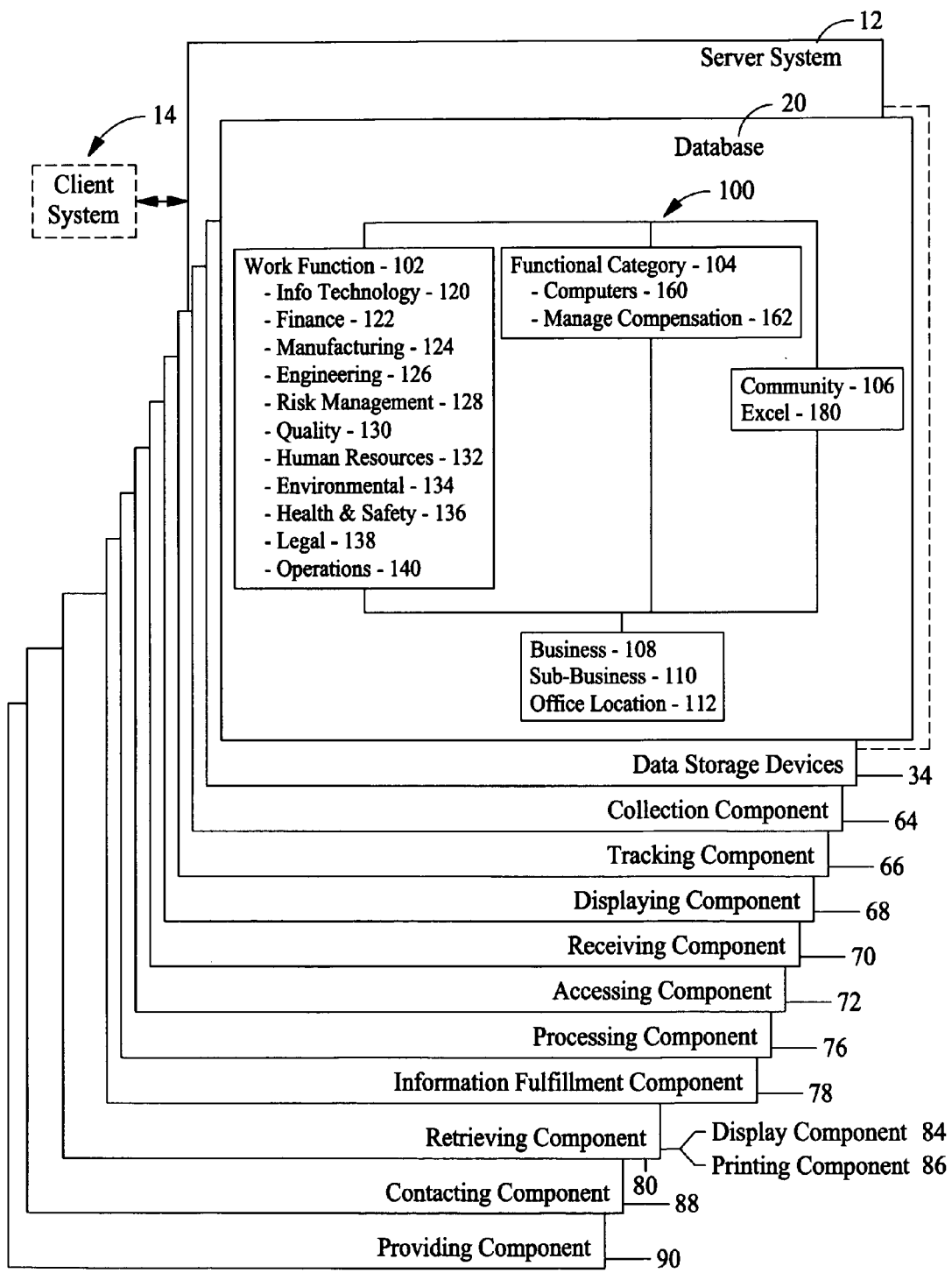
FIG. 3 illustrates an example configuration of a database within the database server of the server system including other related components.

FIG. 3 illustrates a configuration of database 20 within database server 16 of server system 12 shown in FIG. 1. Database 20 is coupled to several separate computer software components within server system 12, which perform specific tasks. Server system 12 includes a collection component 64 for collecting data from users in database 20, a tracking component 66 for tracking data, and a displaying component 68 to display information. Tracking component 66 tracks and cross-references data, including modifying existing data. Server system 12 also includes a receiving component 70 to receive a specific query from client system 14, and an accessing component 72 to access database 20 within server system 12. Receiving component 70 is programmed for receiving a query from one of a plurality of users. Server system 12 further includes a processing component 76 for searching and processing received queries against database 20 containing a variety of information collected by collection component 64. An information fulfillment component 78, located in server system 12, downloads the requested information to the plurality of users in response to the requests received by receiving component 70. Information fulfillment component 78 downloads the information after the information is retrieved from database 20 by a retrieving component 80. Retrieving component 80 retrieves, downloads and sends information to client system 14 based on a query received from client system 14.

Retrieving component 80 also includes a display component 84 that is configured to download information to be displayed on a client system's graphical user interface and a printing component 86 that is configured to print information. System 10 is flexible and is not constrained to the options set forth above.

Server system 12 also includes a contacting component 88 and a providing component 90. Contacting component 88 electronically transmits a message to a selected expert from client system 14. Providing component 90 electronically provides a response from the expert user to client system 14. In one embodiment, collection component 64, tracking component 66, displaying component 68, receiving component 70, processing component 76, information fulfillment component 78, retrieving component 80, display component 84, printing component 86, contacting component 88, and providing component 90 are computer programs embodied on computer readable medium.

Database 20 stores user information 100 inputted through client system 14. Database 20 is organized into a taxonomy to model the operating culture of a company using system 10. In the example embodiment, the taxonomy used to organize database 20 includes Work Function 102, Functional Category 104, and Community 106. Additionally, the taxonomy is laterally organized by at least one of business 108, sub-business 110, and office location 112. Each Work Function 102 is also known as a Super Community.

In the example embodiment, Work Function 102 includes a variety of functional topics including at least one of Information Technology 120, Finance 122, Manufacturing 124, Engineering 126, Risk Management 128, Quality 130, Human Resources 132, Environmental 134, Health and Safety 136, Legal 138, and Operations 140. The functional topics stored on database 20 are not limited to those shown herein, but rather are exemplary. Accordingly, numerous other communities could be stored on database 20. User information 100 is inputted through client system 14 and includes location 112 of user, sub-business 110 of user, business 108 of user, and functional affiliation of user, e.g., one of the functional topics 120, 122, 124, 126, 128, 130, 132, 134, 136, 138, and 140.

Functional Category 104 includes a variety of categories that further divides each functional topic included within Work Function 102. For example, Functional Category 104 may include at least one of Computers 160 and Manage Compensation 162. Therefore, in the example embodiment, Information Technology 120, a topic included within Work Function 102, may be further divided by Functional Category 104 including Computers 160. The Functional Categories listed herein are for exemplary purposes. The Functional Categories can be customized as explained below.

Community 106 includes a variety of communities that further divides each category included within Functional Category 104. For example, Community 106 may include at least one of an Excel Community 180. (Excel is a registered trademark of Microsoft Corporation, Redmond, Wash.) Therefore, in the example embodiment, Information Technology 120, a topic included within Work Function 102, may be divided by Computers 160, a category included within Functional Category 104, which is further divided by Excel Community 180. Similarly, in the example embodiment, Human Resources 132 may be further organized by Manage Compensation Functional Category 162. The Communities listed herein are for exemplary purposes. The Communities can be customized as explained below.

Additionally, system 10 is further organized by at least one of business 108, sub-business 110, and office location 112. In the example embodiment, Excel Community 180 can either be targeted to the entire company globally, or to a specific business within the company (e.g., Power Systems), a specific sub-business within the company (e.g., Nuclear Energy), or an office location such as New Haven, Conn.

System 10 allows for an aggregation of related Communities 106 into a single Functional Category 104. For example, a "Coreload" Community may include communities that each support the Microsoft Office applications loaded onto the company's computers by default, such as Excel®, Access®, Word®, and PowerPoint®. (Microsoft is a registered trademark of Microsoft Corporation, Redmond, Wash. Excel, Access, Word, and PowerPoint are all trademarks of Microsoft Corporation, Redmond, Wash.) The aggregation provides a single, consolidated view of the related communities. Users no longer need to browse hundreds or thousands of communities to find related ones, and are instantly aware of any new communities formed as soon as they are added to system 10.

Additionally, system 10 enables various groups to establish a presence, or "portal" site, on the company's intranet as an entry into the informational assets and human expertise available on a broader network, such as a wide area network (WAN) or through the Internet.

In the example embodiment, each Community 106 included within system 10 is managed by a Super Facilitator and as many as four additional Chief Facilitators. The Super/Chief Facilitators are responsible for maintaining the list of communities displayed, as well as communicating with the users of system 10. The Super/Chief Facilitators have a plurality of functions available to them that leverage the aggregation model, including at least one of: (i) attach a document or survey into any of the member communities; (ii) provide functional tabs (a navigation aide) into any of the member communities; (iii) define custom categories to organize communities (apart from the default taxonomy used within system 10); (iv) apply groups of employees who have access to secure documents to any of the member communities; (v) send email to the subscribers to any of the member communities; (vi) view a consolidated report of expert schedules and performance; (vii) view consolidated metrics on the performance and vitality of member communities; (viii) view all projects in progress in member communities; (ix) view consolidated feedback submitted to member communities; and (x) view other consolidated reports on member communities.

System 10 enables a small group of people to manage and monitor the overall use of system 10 including at least one of a number of visits, downloads, cases, and new forum messages. In the example embodiment, system 10 also facilitates a user's navigation within the system. System 10 further enables the higher levels of management with the company to participate in ownership and stewardship of vital information stored in the company's computer system, and facilitates increased employee productivity through time saved in otherwise locating information on the computer system or obtaining assistance.

In the example embodiment, system 10 is extendable. System 10 therefore can be extended to include an unlimited number of defined work functions within the company.

System 10 accumulates a variety of confidential data, and accordingly includes different access levels to control and monitor the security of the system. Authorization for access is assigned by system administrators on a need to know basis. In one embodiment, system 10 provides access based on job functions. In yet another embodiment, system 10 provides access based on business-entity. The administration/editing capabilities within system 10 are also restricted to ensure that only authorized individuals have access to modify or edit the data existing in the system. System 10 manages and controls access to system data and information.

The architectures of system 10 as well as various components of system 10 are exemplary only. Other architectures are possible and can be utilized in connection with practicing the processes described below.

Figure 4:
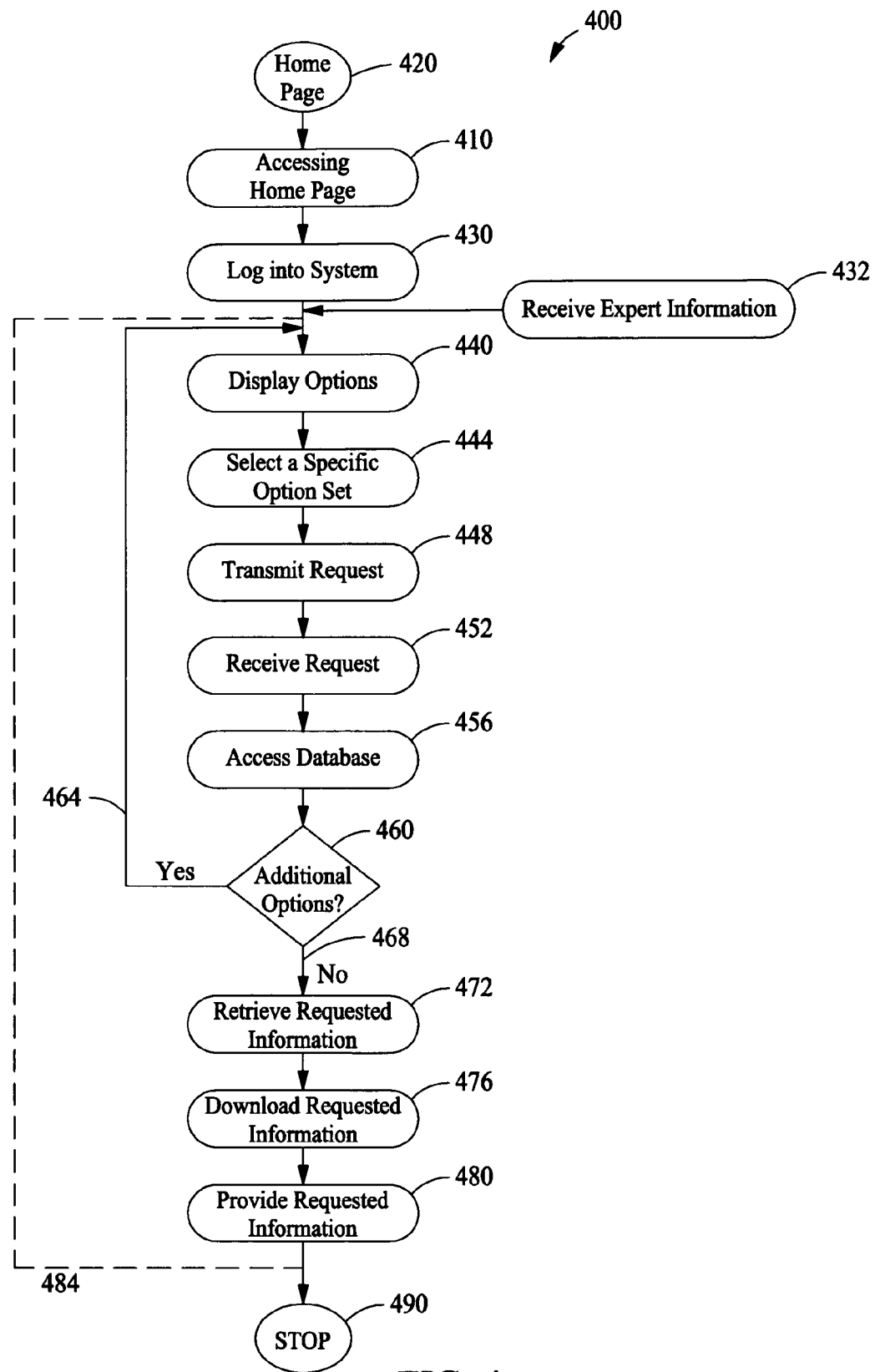
FIG. 4 is an example flowchart illustrating an example process employed by SCS.

FIG. 4 is a flowchart 400 illustrating an example process employed by system 10 (shown in FIG. 1). A technical effect of SCS 10 is achieved by a user first accessing 410 a user interface, such as a home page 420, of the web site through client system 14 (shown in FIG. 1). In one embodiment, client system 14, as well as server system 12 (shown in FIG. 1), are protected from access by unauthorized individuals. The user logs-in 430 to system 10 using a password (not shown) or an employee payroll number for security. Client system 14 receives 432 requested expert information from server system 12, and displays 440 options available to the user through links, check boxes, or pull-down lists. The user selects 444 an option from the available links, and the request is transmitted 448 to server system 12. In one embodiment, the options relate to at least one of work function, functional category, and community. In another embodiment, the options relate to at least one of business, sub-business, and location. The request is transmitted 448, in the example embodiment, by clicking a mouse.

Once server system 12 receives 452 the request, server system 12 accesses 456 database 20 (shown in FIG. 1). System 10 determines 460 if additional narrowing options are available. If additional narrowing options are available 464, system 10 displays 440 the additional options. The user selects 444 from the additional options and transmits the request 448. Server system 12 receives the request 452 and accesses 456 database 20. When system 10 determines 460 that additional options are not available 468, system 10 retrieves 472 requested information from database 20. The requested information, organized by at least one of work function, functional category, and community, is downloaded 476 and provided 480 to client system 14 from server 12. The user can continue to search 484 database 20 for other information or exit 490 from system 10.

In the example embodiment, system 10 is accessed through a home page which provides the user with the ability to navigate and search information. The system allows a user to navigate, search, and in some cases create/edit/delete online documentation, manuals (also available in downloadable format), frequently asked questions, articles & URL's, various pages and other discussion materials. When a first-time user enters the site, the user is presented with a generic page (not shown). After the user "signs up" for the system, a "cookie" is established on the user's computer, which allows the system to customize the page upon the user's next return. Each home page also includes several pre-set frames (not shown).

Figure 5A:
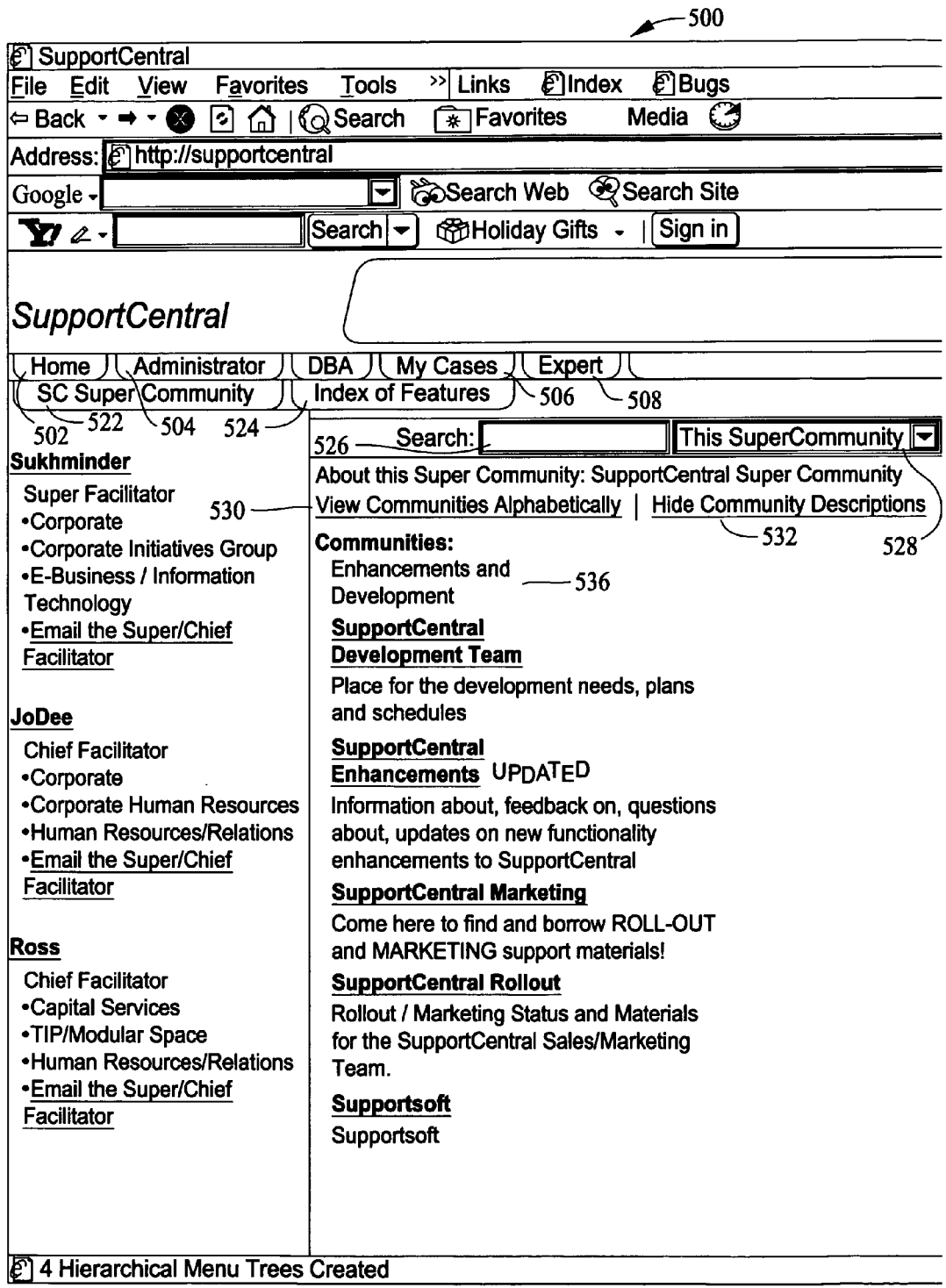
FIGS. 5A, 5B and 5C show an example embodiment of a user interface of a SCS that displays a Super Community home page in a "classic" mode.
Figure 5B:
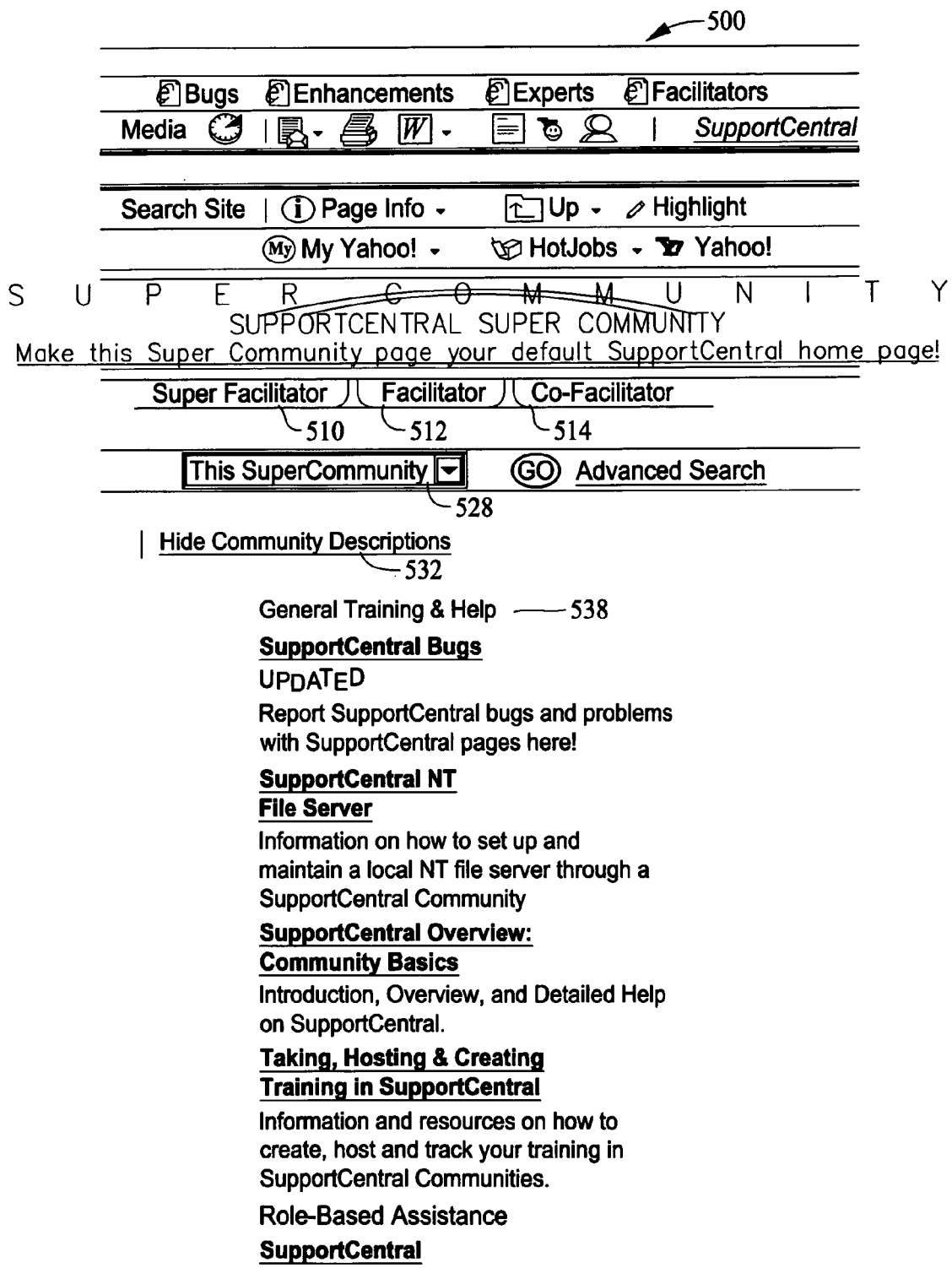
Figure 5C:
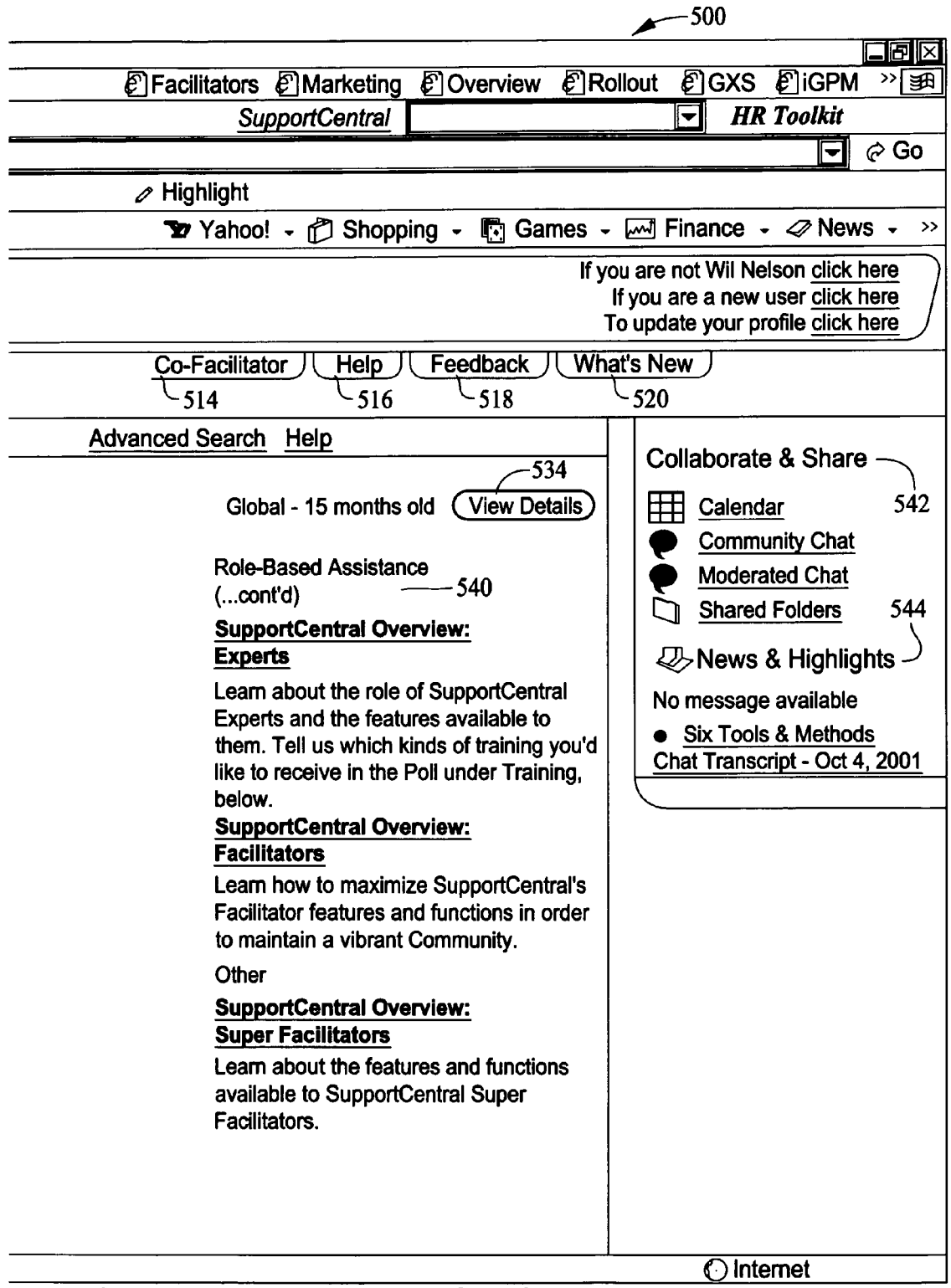

FIGS. 5A, 5B and 5C show an example embodiment of a user interface 500 displaying a home page in a "classic" mode within SCS 10 (shown in FIG. 1). User interface 500 is also referred to as the SupportCentral Super Community home page. User interface 500 provides a user with certain navigational features and relevant information relating to SCS 10. In the example embodiment, user interface 500 displays a plurality of navigational tabs that include at least one of a Welcome tab 502, an Administrator tab 504, a My Cases tab 506, an Expert tab 508, a Super Facilitator tab 510, a Facilitator tab 512, a Co-Facilitator tab 514, a Help tab 516, a Feedback tab 518, and a What's New tab 520.

User interface 500 also displays a Super Community pull-down tab 522, an Index of Features tab 524, a Search data field 526, a Super Community pull-down list 528 that enables a user to refine a search, a View Communities Alphabetically link 530, a Hide Community Descriptions link 532, a View Details button 534, an Enhancement and Development section 536, a General Training & Help section 538, a Role-Based Assistance section 540, a Collaborate & Share section 542, and a News & Highlights section 544. Super Community pull-down list 528 displays each Super Community included within SCS 10 and enables a user to refine a search. The Super Communities are an aggregate of similar communities that relate to a single topic of work function. User interface 500 enables a user to navigate SCS 10 and access certain information included within SCS 10.

Figure 6B:
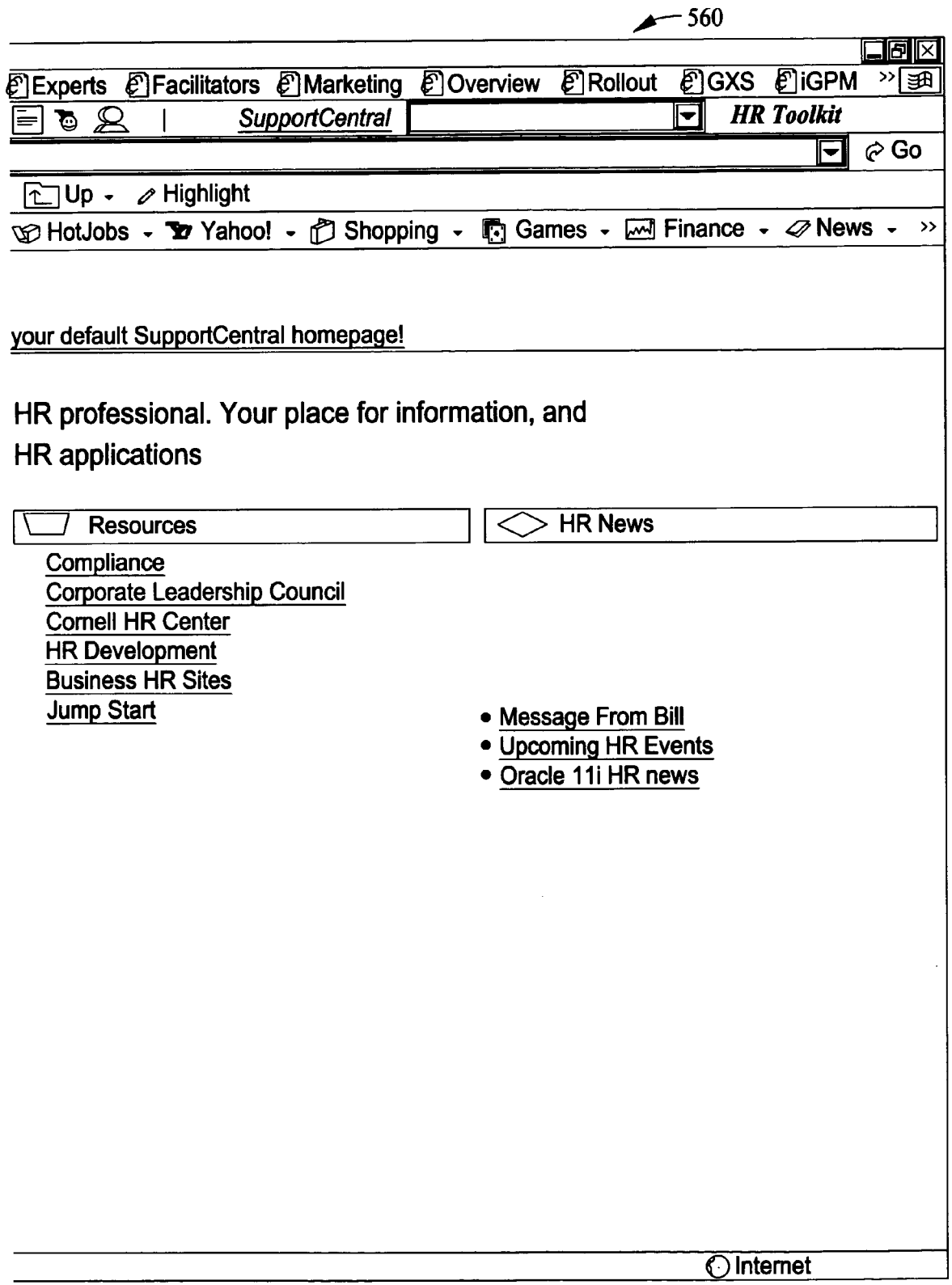

FIGS. 6A and 6B show an example embodiment of a user interface 560 displaying a Human Resources Super Community page, which is in a "customized" mode, included within SCS 10 (shown in FIG. 1). User interface 560 is a Super Community home page that relates to Human Resources. It can be accessed through user interface 500 (shown in FIGS. 5A, 5B and 5C). In the example embodiment, Human Resources 132 (shown in FIG. 3) is included as a Work Function 102 or a Super Community.

User interface 560 displays Functional Categories 104 (shown in FIG. 3) included within the Human Resources Super Community including at least one of Manage Compensation, Manage Employees Events, Manage Employees Leaves and Departures, Hire and On Board, and Develop Your People. User interface 560 also displays below each Functional Category a list of Communities 106 (shown in FIG. 3) that relate to the corresponding Functional Category. For example, the Communities listed below Manage Employee Events Functional Category include at least one of Payroll, Retirement, Employee Benefits, Awards, and Healthcare. The Functional Categories and the Communities listed herein are for exemplary purposes. Both the Functional Categories and the Communities are dynamic and fully defined, as explained below, by a Super Facilitator.

Figure 7A:
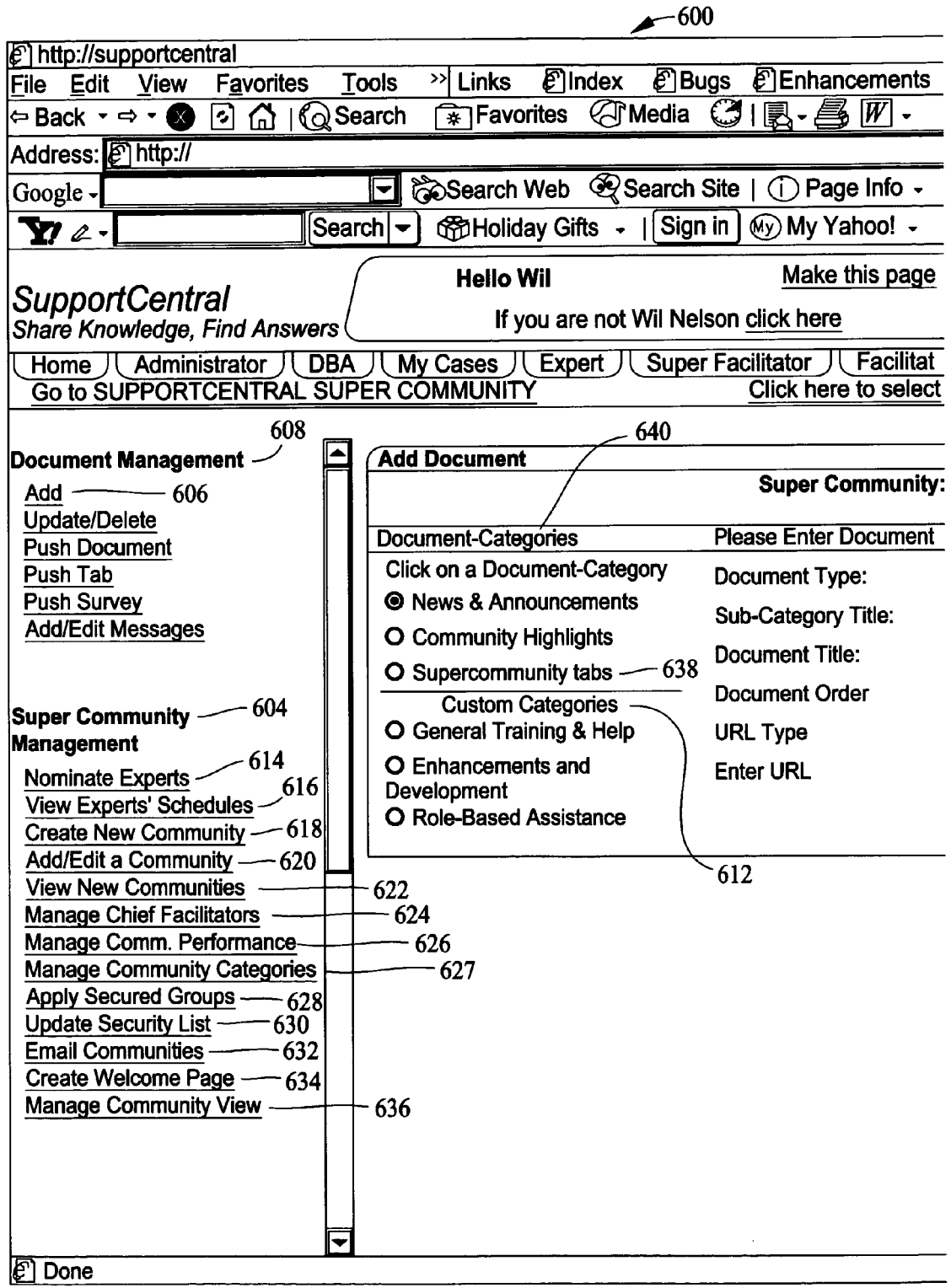

FIGS. 7A and 7B show an example embodiment of a user interface 600 displaying an Add Documents/Links/News page included within SCS 10 (shown in FIG. 1). User interface 600 is displayed if a user has been designated as a Super Facilitator. If a user has been designated as a Super Facilitator, Super Facilitator tab 510 (shown in FIGS. 5A, 5B and 5C) will be displayed on user interface 500 (shown in FIGS. 5A, 5B and 5C). Super Facilitators have access to certain functions included with SCS 10 that other users may not have access to.

In the example embodiment, user interface 600 may be displayed after a Super Facilitator accesses user interface 500 and selects Super Facilitator tab 510. User interface 600 enables a Super Facilitator to add documents and links to various Functional Categories defined in a Super Community. The Add Documents/Links to Categories is used to addd relevant links and documents under assigned Categories. User interface 600 displays a Super Community Management section 604.

In the example embodiment, the Add Documents/Links to Categories function is accessed through the following steps: (a) click on an Add link 606 located under a Document Management header 608 so that a page for adding documents and links 610 will open; (b) click on a radio button next to a Custom Category 612 where the document or link is to be uploaded to; (c) upload the desired document/link; and (d) go to the Super Community to view the list of the Communities with the customized categories and the links assigned to the categories.

In the example embodiment, Super Community Management section 604 includes a Nominate Experts link 614, a View Experts' Schedules link 616, a Create New Community link 618, an Add/Edit a Community link 620, a View New Communities link 622, a Manage Chief Facilitators link 624, a Manage Communities Performance link 626, a Manage Community Categories link 627, an Apply Secured Groups link 628, an Update Security List link 630, an E-Mail Communities link 632, a Create a Welcome Page link 634, and a Manage Community View link 636.

A Super Facilitator may also add and/or edit a category included within an assigned Community. The Add/Edit a Community function enables a Super Facilitator to include a community of interest related to the topic of the Super Community. In the example embodiment, the Add/Edit a Community function is accessed in the following manner: (a) click on Super Facilitator tab 510 on user interface 500 (shown in FIGS. 5A, 5B and 5C); (b) click on "Add/Edit a Community" link 620 under "Super Community Management" section 604, which will cause a screen (not shown) to be generated to enable the Super Facilitator to browse a list of Communities to add, based on Business, Sub-Business, and Function; (c) click a checkbox next to the Community (ies) or other Super Community(ies) to be added; and (d) click a "Submit" button (not shown).

If, however, the Super Facilitator intends to edit or modify a particular Community Category, the Super Facilitator highlights the particular category and clicks on an Edit button (not shown). The selected category will then appear in a Category Name field so that the Super Facilitator can make the necessary changes. Once the changes have been made, the Super Facilitator clicks on an Add button (not shown) to save the changes. The edited Category Name will then appear in a Community Category List.

If, however, the Super Facilitator intends to delete a particular Community Category, the Super Facilitator highlights the particular category and clicks on a Delete button (not shown). The selected category will then be deleted. If, however, there are any Communities assigned to the category to be deleted, the Communities must be removed from the category before it can be deleted.

If, however, the Super Facilitator intends to assign a Community to a category, the Super Facilitator selects a category from the Category List, and clicks on an Assign Communities to Category link (not shown) to display a list of all the Communities within that Super Community. The Super Facilitator then checks a box (not shown) next to the selected Community name to add the Community to this category. If the Community is already assigned to the category, then the corresponding check box will be checked and disabled. The Super Facilitator can then view the Communities assigned to that category by clicking on a View/Edit Communities in category button (not shown).

In the example embodiment, a Super Facilitator may also view new Communities. The View New Communities function enables a Super Facilitator to view all new Communities based on an assigned business, sub-business, and function on a monthly basis. The View New Communities function enables a Super Facilitator to track new Comunities that they might want to include as part of their assigned Super Community. In the example embodiment, a Super Facilitator accesses the View New Communities function in the following manner: (a) click on Super Facilitator tab 510 (shown in FIGS. 5A, 5B and 5C), causing user interface 600 (shown in FIGS. 5A, 5B and 5C) to be displayed; and (b) click on View New Communities link 622 located under Super Community Management section 604, which enables the super Facilitator to view and add to Communities to a Super Community. The Super Facilitator may also view the new Communities that have been created during the current month for a selected business. If the Super Facilitator intends to add a Community to their assigned Super Community, the Super Facilitator checks a box (not shown) next to the Community name and clicks a Submit button (not shown) to add it to the assigned Super Community. If a Community is already listed in the Super Community, then the check box next to it will be disabled. The Super Facilitator may also select a different month and year from a drop down box (not shown) to view Communities created during the specified month and year.

User interface 600 also enables a Super Facilitator to add items to menu tabs displayed on a Super Community page. By adding items to menu tabs, relevant information is made more accessible to Super Community members. A Super Facilitator adds items to menu tabs by: (a) clicking on a Super Community Tabs radio button 638 under a Click on a Document Category section 640; (b) clicking on an Add URL radio button next to Document Type to add a URL to a Menu Tab; (c) entering a name to appear on the Menu Tab; (d) entering a name of the item to be added to the Menu Tab in an Item Name space provided; (e) clicking on URL and entering the URL that coincides with the item name in the provided space; (f) clicking on radio button 638 under Click on Document Category section 640; and (g) clicking an Add button and then an OK button. The Menu Tab is created and will appear in the assigned Super Community.

The Super Facilitator may also add items to menu tabs by: (a) clicking on an Upload File radio button to add a file to a Menu Tab; (b) entering a name of the Menu Tab to be added; (c) entering a name of the item to be added to the Menu Tab; (d) clicking a Browse button to select the file to be added; (e) clicking on radio button 638 under Click on Document Category section 640; and (f) clicking an Add button and an OK button. In the example embodiment, both URLs and files can be added to the same Menu Tab.

Figure 8A:
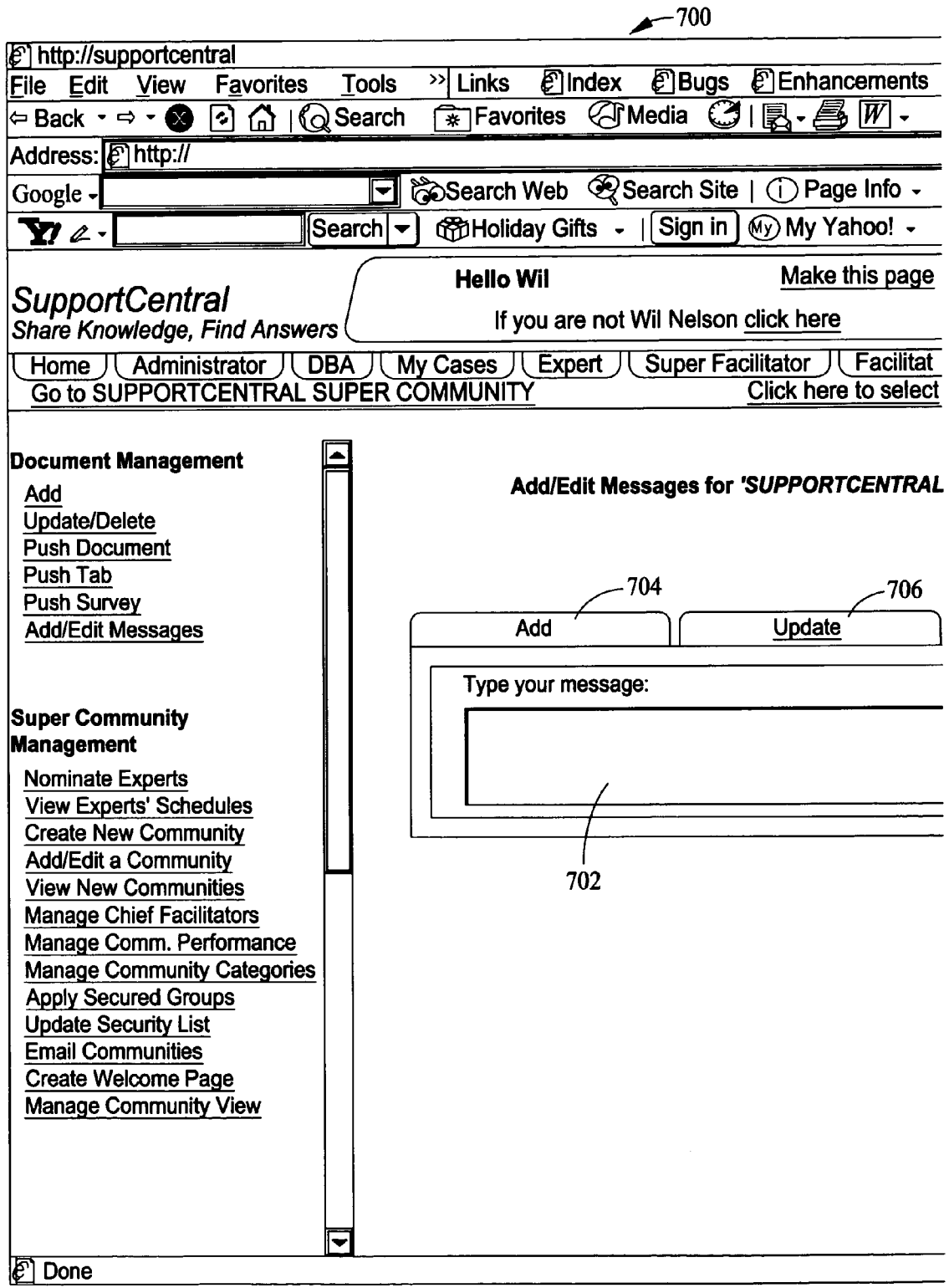

FIGS. 8A and 8B show an example embodiment of a user interface 700 displaying an Add/Edit Message From Super Facilitator page included within SCS 10 (shown in FIG. 1). User interface 700 is displayed if a user has been designated as a Super Facilitator. In the example embodiment, user interface 700 may be displayed after a Super Facilitator selects Super Facilitator tab 510 (shown on FIGS. 5A, 5B and 5C). User interface 700 enables a Super Facilitator to add messages on a Super Community home page.

In the example embodiment, the Add/Edit Message From Super Facilitator function is accessed by clicking on an Add/Edit Messages link (shown in FIGS. 7A and 7B) located under Document Management section 608 (shown in FIGS. 7A and 7B) which causes user interface 700 to open. User interface 700 displays three tabs above a message data box 702. The three tabs include an Add tab 704, an Update tab 706, and a Delete tab 708. Add tab 704 enables the Super Facilitator to add a message through message box 702. Update tab 706 enables the Super Facilitator to update an existing message, and Delete tab 708 enables the Super Facilitator to delete an existing message.

User interface 700 enables the Super Facilitator to add a message in one of two categories by displaying a "Message from the Super Facilitator" radio button 710, and a "Message under News and Highlights" radio button 712. A user may view messages by accessing the SupportCentral Super Community home page (shown in FIGS. 5A, 5B and 5C). Messages from the Super Facilitator are displayed at the top of user interface 500 (shown in FIGS. 5A, 5B and 5C). The messages under News & Highlights are displayed in News & Highlights section 544 of user interface 500 (shown in FIGS. 5A, 5B and 5C).

Figure 9B:
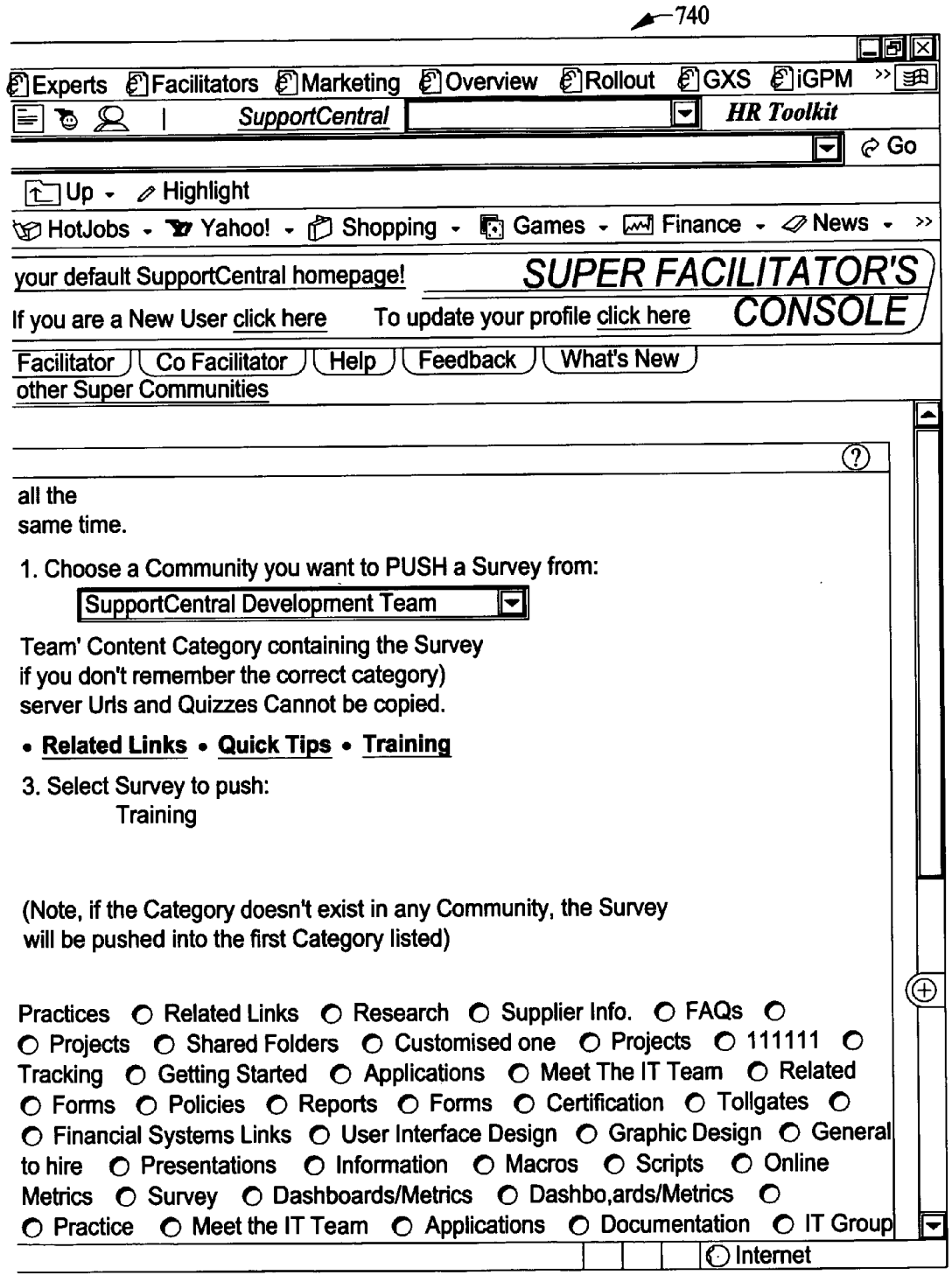

FIGS. 9A and 9B show an example embodiment of a user interface 740 displaying a Push Surveys page included within SCS 10 (shown in FIG. 1). User interface 740 is displayed if a user has been designated as a Super Facilitator. In the example embodiment, user interface 740 may be displayed after a Super Facilitator selects Super Facilitator tab 510 (shown on FIGS. 5A, 5B and 5C) and a Push Survey link under Document Management section 608 (shown in FIGS. 7A and 7B). User interface 740 enables a Super Facilitator to add or "push" a selected survey to a Community.

Similarly, SCS 10 also enable a Super Facilitator to push menu tabs to a select Community. The Super Facilitator does so by clicking on a Push Tab link under Document Management section 608, and then by selecting the Tab to be and the Community where the Tap is to be pushed to.

Figure 10A:
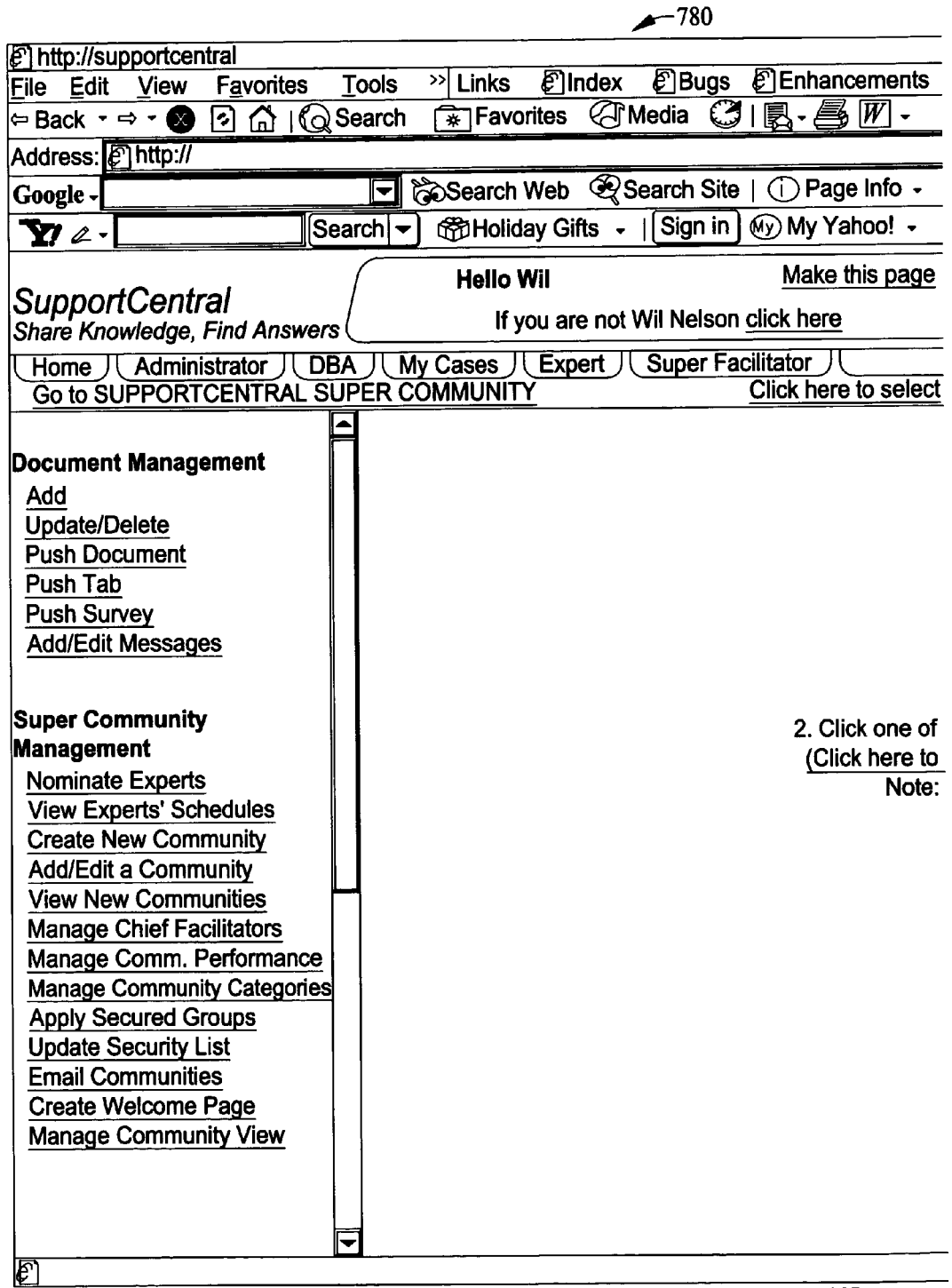
FIGS. 10A and 10B show an example embodiment of a user interface of a SCS that displays a Push Documents page.
Figure 10B:
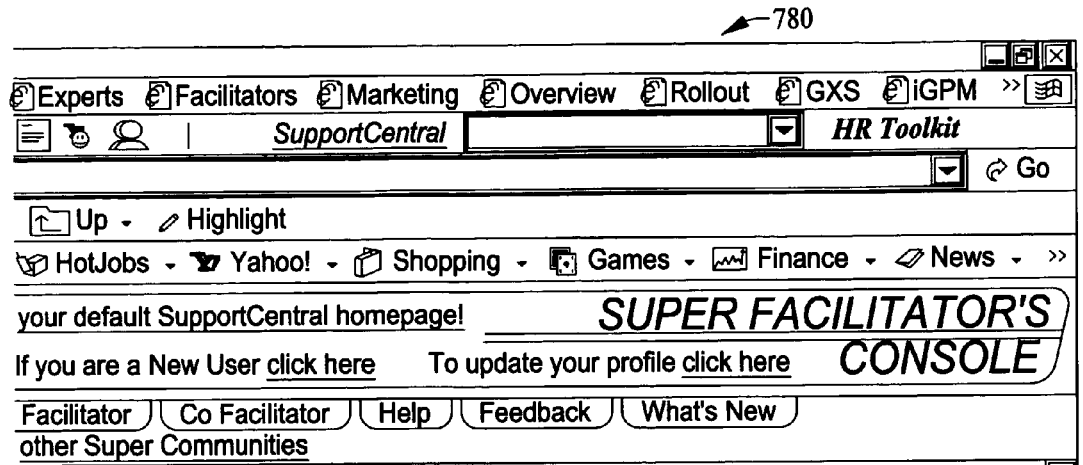

FIGS. 10A and 10B show an example embodiment of a user interface 780 displaying a Push Documents page included within SCS 10 (shown in FIG. 1). In the example embodiment, user interface 780 may be displayed after a Super Facilitator selects Super Facilitator tab 510 (shown on FIGS. 5A, 5B and 5C) and a Push Document link under Document Management section 608 (shown in FIGS. 7A and 7B). User interface 780 enables a Super Facilitator to add or "push" a document or a link to any or all Communities under a Super Community. To push a document or link, a Super Facilitator selects from a Communities drop-down list 782 a Community or Communities to push a document or link from, and clicks on a Content Category 784 where the document or link is located. The page is then refreshed, and the available documents or links are displayed. The Super Facilitator then clicks on a radio button 786 next to the desired document or link to be pushed to the other Communities, selects a Content Category (not shown) where the selected document or link is to be pushed, and clicks on a Push button (not shown). The document or link will be pushed in the selected Content Category in all the Communities within the Super Community.

FIGS. 11A and 11B show an example embodiment of a user interface 800 displaying a Send E-Mail to All Member Communities page included within SCS 10 (shown in FIG. 1). In the example embodiment, user interface 800 may be displayed after a Super Facilitator selects Super Facilitator tab 510 (shown on FIGS. 5A, 5B and 5C) and an E-Mail Communities link 632 under Document Management section 608 (shown in FIGS. 7A and 7B). User interface 800 enables a Super Facilitator to send an e-mail to all the Communities within an assigned Super Community or selected assigned Super Communities.

Figure 12B:
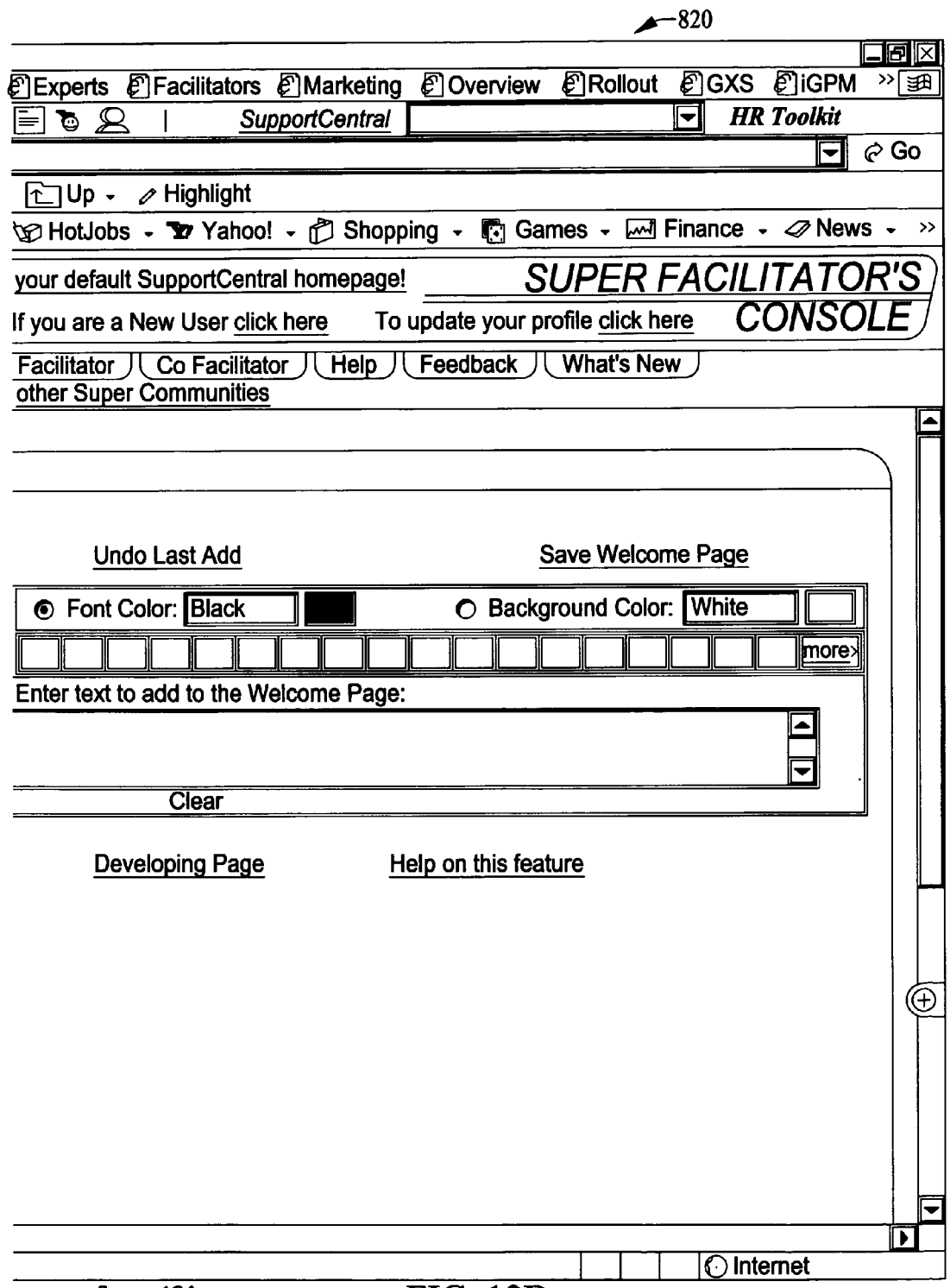

FIGS. 12A and 12B show an example embodiment of a user interface 820 displaying a Create A Welcome page included within SCS 10 (shown in FIG. 1). In the example embodiment, user interface 820 may be displayed after a Super Facilitator selects Super Facilitator tab 510 (shown on FIGS. 5A, 5B and 5C) and a Create a Welcome Page link under Document Management section 608 (shown in FIGS. 7A and 7B). User interface 820 enables a Super Facilitator to create and display a Welcome Page for a Super Community. By creating a Welcome Page for a Super Community, users of the Super Community are provided with an overview of what information is available through a particular Super Community. The Welcome Page also enables a Super Facilitator to broadcast any important messages for users to access before accessing the main content of the Super Community Welcome Page.

SCS 10 also enables a Super Facilitator to nominate an expert for at least one or all of the Communities listed within a Super Community. The Super Facilitator nominates an expert by: (a) clicking on Super Facilitator tab 510 (shown on FIGS. 5A, 5B and 5C) and then clicking Nominate Experts link 614 (shown in FIGS. 7A and 7B) under Super Community Management section 604; (b) clicking on an Add People as Experts link (not shown) to add an Expert to a selected Super Community; (c) searching for the people to be add as an Expert by looking them up through a list provided by the system; and (d) clicking an Add & Close button (not shown) once the selections are made. The selected names will then be displayed in an Experts field.

SCS 10 also enables a Super Facilitator to view an expert's schedule in any of the member Communities. This function allows a Super Facilitator to confirm that there is adequate expert coverage in all Communities. The Super Facilitator views experts' schedules by: (a) clicking on Super Facilitator tab 510 (shown on FIGS. 5A, 5B and 5C) and then clicking View Experts' Schedules link 616 (shown in FIGS. 7A and 7B) under Super Community Management section 604 to display the Experts that are available in that particular Community; (b) clicking the Expert of choice to view their profile; and (c) clicking the tab of a different Community to view the schedules for that Community. In the example embodiment, the bottom line of a report summarizes empty time slots when no Expert is available, and a flashing green or red light next to the Expert names reference whether the Expert is available via electronic chat.

SCS 10 further enables a Super Facilitator to apply a secured group from one Community to another. This function allows a Super Facilitator to restrict access to particular content in a Community. The Super Facilitator applies secured groups: (a) clicking on Super Facilitator tab 510 (shown on FIGS. 5A, 5B and 5C) and then clicking Apply Secured Groups link 628 (shown in FIGS. 7A and 7B) under Super Community Management section 604 to display a listing of Communities; (b) selecting the Community with the secure group to be applied to other Communities; (c) checking the Communities to apply the secured group; and (d) clicking a Submit button. In the example embodiment, if someone is already a member of a secured group in a target Community, their name will not be added twice.

SCS 10 further enables a Super Facilitator to add and remove users who can view restricted Super Communities. This function allows a Super Facilitator to maintain the users of restricted Super Communities. The Super Facilitator updates a security list by clicking on Super Facilitator tab 510 (shown on FIGS. 5A, 5B and 5C) and then clicking Update Security List link 630 (shown in FIGS. 7A and 7B) under Super Community Management section 604. A screen may then be displayed with the following message; "this feature is available only for Restricted Super Communities". The Super Facilitator then selects a Community and clicks on Update Security List link 630. The list of users who can access the Restricted Super Community can then be updated by using an Add and Remove buttons. The page will confirm that the operation was successful.

Figure 13A:
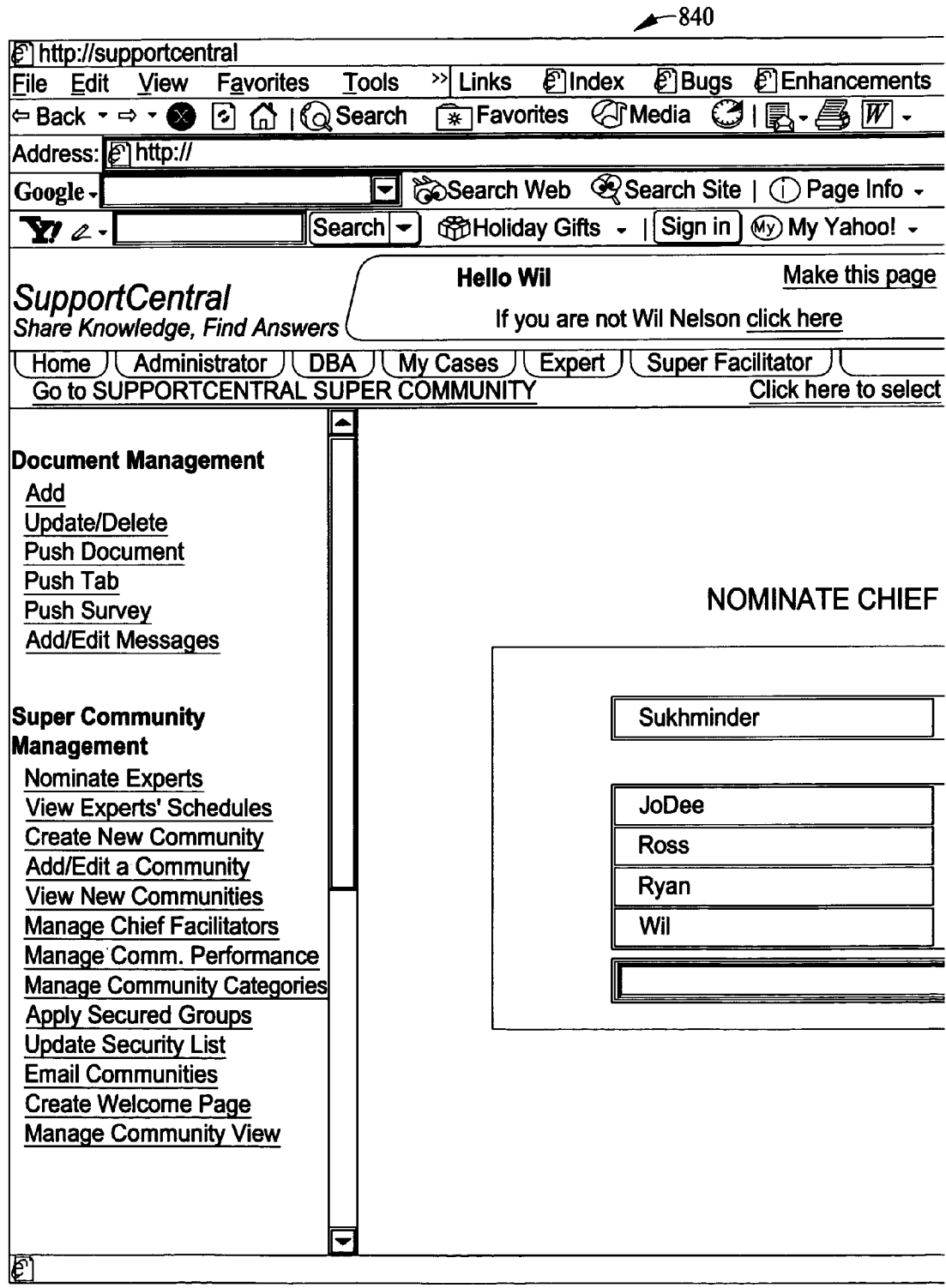
FIGS. 13A and 13B show an example embodiment of a user interface of a SCS that displays an Appoint Chief Facilitators page.
Figure 13B:
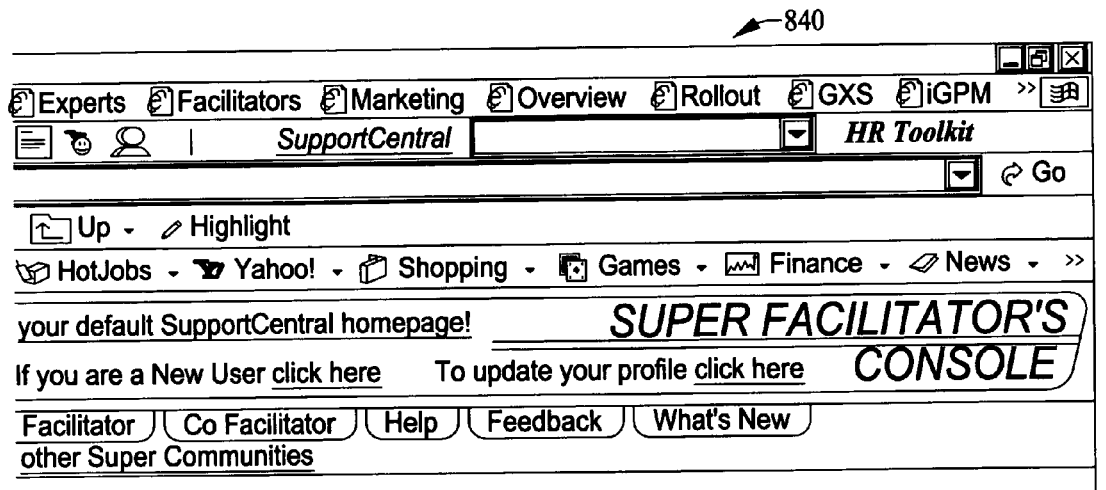

FIGS. 13A and 13B show an example embodiment of a user interface 840 displaying an Appoint Chief Facilitators page included within SCS 10 (shown in FIG. 1). In the example embodiment, user interface 840 may be displayed after a Super Facilitator selects Super Facilitator tab 510 (shown on FIGS. 5A, 5B and 5C) and Manage Chief Facilitators link 624 (shown in FIGS. 7A and 7B) under Super Community Management section 604 (shown in FIGS. 7A and 7B). User interface 840 enables a Super Facilitator to nominate and manage Chief Facilitators. In the example embodiment, each Community included within SCS 10 is managed by a Super Facilitator and as many as four additional Chief Facilitators. The Super/Chief Facilitators are responsible for maintaining the list of communities displayed, as well as communicating with the users of system 10. The Super/Chief Facilitators have a plurality of functions available to them that leverage the aggregation model, including at least one of: (i) attach a document or survey into any of the member communities; (ii) provide functional tabs (a navigation aide) into any of the member communities; (iii) define custom categories to organize communities (apart from the default taxonomy used within system 10); (iv) apply groups of employees who have access to secure documents to any of the member communities; (v) send email to the subscribers to any of the member communities; (vi) view a consolidated report of expert schedules and performance; (vii) view consolidated metrics on the performance and vitality of member communities; (viii) view all projects in progress in member communities; (ix) view consolidated feedback submitted to member communities; and (x) view other consolidated reports on member communities.

Figure 14B:
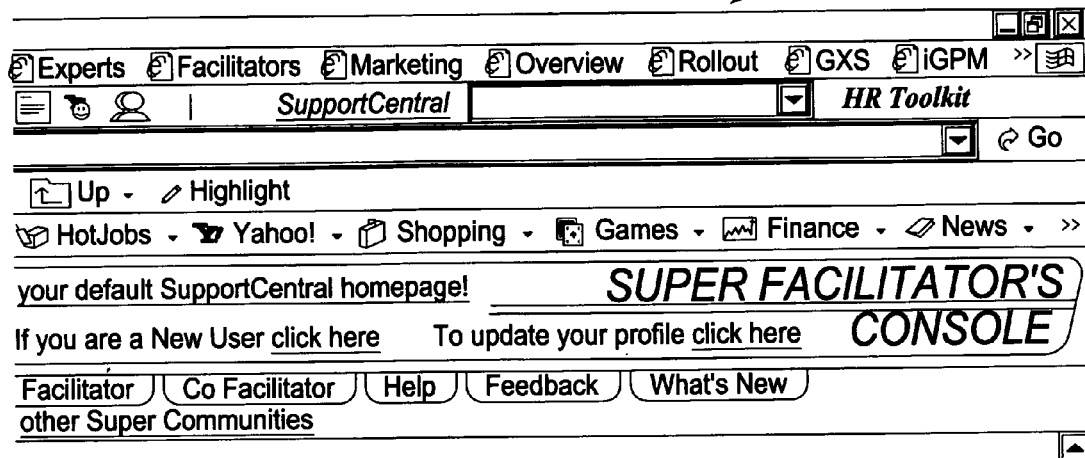

FIGS. 14A and 14B show an example embodiment of a user interface 860 displaying a Consolidated Community Reports page included within SCS 10 (shown in FIG. 1). In the example embodiment, user interface 860 may be displayed after a Super Facilitator selects Super Facilitator tab 510 (shown on FIGS. 5A, 5B and 5C) and Manage Community Performance 626 (shown in FIGS. 7A and 7B) under Super Community Management Section 604. User interface 860 enables a Super Facilitator to view the performance of a Community on a "Number of Visits" basis.

FIGS. 15A and 15B show an example embodiment of a user interface 880 displaying a Cumulative Community Report page included within SCS 10 (shown in FIG. 1). In the example embodiment, user interface 880 may be displayed after a Super Facilitator selects Super Facilitator tab 510 (shown on FIGS. 5A, 5B and 5C) and a Cumulative Community Reports link 882 under a Reports section 884.

User interface 880 also displays Report section 882 that includes at least one of the following report links: Cumulative Community Reports link 882, a Monthly Community Report links: a Commulative Feedback link, a Cases Overall Report link, a Workflow From Status link, a Case Status link, a VOC link, a Projects link, and an Export Cases to Excel link.

SCS 10 therfore better enables an entity to organize information stored within a computer systems by aggregating related communities of experts and information into a single view, wherein the information is oranized into work function know as "Super Communities". Additionally, the information may be laterally organized by at least one of business, sub-business, and office location. By better organizing the information stored within a computer system, especially in systems having numerous databases storing vast amounts of information such as the wide area network commonly referred to as the Internet. SCS 10 enables users to more quickly locate relevant information and experts stored within the computer system.

While the invention has been described in terms of various specific embodiments, those skilled in the art will recognize that the invention can be practiced with modification within the spirit and scope of the claims.

What is claimed is:

1. A method for organizing information stored within a computer network-based system that includes a server system coupled to a centralized database and at least one client system, said method comprising the steps of:
   receiving at the server system information from the client system, the information including documentation relating to a plurality of topics and a list of experts on a plurality of topics;
   storing information received at the server system in the centralized database;
   organizing the information stored in the centralized database;
   aggregating related information stored within the database into a hierarchical data structure including a work function segment, a functional category segment and a community segment, wherein each work function segment includes at least one functional category segment and each functional category segment includes at least one community segment, and wherein each work function segment includes information relating to the corresponding work function, each functional category segment includes information relating to the corresponding functional category, and each community segment includes information relating to the corresponding community; and
   displaying a user interface on the client system to enable a user to search the database for a specific item of information by the hierarchical data structure including at least one of work function, functional category, and community.

2. A method according to claim 1 further comprising the steps of:
   generating a plurality of reports including at least one of experts' schedules and performance, a consolidated community metrics report, a monthly community metrics report, a consolidated community feedback report, a workflow form status report, and a ease status report; and
   displaying on the client system for a permissioned user the plurality of generated reports.

3. A method according to claim 1 wherein aggregating related information further comprises aggregating related information into the hierarchical data structure further including a business segment, a sub-business segment, and an office location segment.

4. A method according to claim 1 wherein aggregating related information further comprises:
   assigning a facilitator to at least one community segment for maintaining information stored within the at least one community segment, the facilitator is a member of the at least community segment having permission to perform certain tasks within the computer system that other members do not have permission to perform;
   enabling the facilitator to attach a document and a survey to the at least one community segment assigned to the facilitator;
   enabling the facilitator to provide functional tabs for navigational purposes into the at least one community segment assigned to the facilitator;
   enabling the facilitator to view a consolidated report of expert schedules and performance for the at least one community segment assigned to the facilitator; and
   enabling the facilitator to view consolidated metrics on the performance and activity of the at least one community segment assigned to the facilitator.

5. A method according to claim 1 wherein aggregating related information further comprises displaying related communities on a single, consolidated user interface on the client system.

6. A method according to claim 1 wherein aggregating related information further comprises enabling a permissioned user to attach at least one of a document and a survey into a community assigned to the permissioned user.

7. A method according to claim 1 wherein aggregating related information further comprises enabling a permissioned user to define custom categories to further organize communities.

8. A method according to claim 1 wherein aggregating related information further comprises enabling a permissioned user to secure specific information within a community such that the secured information is accessible by only authorized users.

9. A method according to claim 1 wherein displaying a user interface on the client system to enable a user to search the database for a specific item of information further comprises enabling a permissioned user to provide functional tabs in a community assigned to the permissioned user that are displayed on the client system for navigational purposes.

10. A method according to claim 1 wherein displaying a user interface on the client system to enable a user to search the database for a specific item of information further comprises enabling a permissioned user to transmit an electronic message to users of a community by attaching the electronic message to the user interface.

11. A method according to claim 1 further comprising connecting the client system and the server system via a network that includes one of a local area network, a wide area network, and intranet, and the Internet.

12. A network based system for organizing information stored within said system, said system comprising:
a client system comprising a browser;
a centralized database for storing information; and
a server system configured to be coupled to said client system and said database, said server system further configured to:
receive information from said client system, said information includes documentation relating to a plurality of topics and a list of experts on a plurality of topics;
store information in the centralized database;
organize information stored in the centralized database; and
aggregate related information stored within the database into a hierarchical data structure including a work function segment, a functional category segment and a community segment, wherein each work function segment includes at least one functional category segment and each functional category segment includes at least one community segment, and wherein each work function segment includes information relating to the corresponding work function, each functional category segment includes information relating to the corresponding functional category, and each community seament includes information relating to the corresponding community.

13. A system according to claim 12 wherein said server system is further configured to display a user interface on said client system to enable a user to search the database for a specific item of information by the hierarchical data structure including at least one of work function, functional category, and community.

14. A system according to claim 12 wherein said server system is further configured to:
generate a plurality of reports including at least one of experts' schedules and performance, a consolidated community metrics report, a monthly community metrics report, a consolidated community feedback report, a workflow form status report, and a case status report; and
display on said client system for a permissioned user said plurality of generated reports.

15. A system according to claim 12 wherein said server system is further configured to aggregate related information into the hierarchical data structure further including a business segment, a sub-business segment, and an office location segment.

16. A system according to claim 12 wherein said server system is further configured to:
assign a facilitator to at least one community segment for maintaining information stored within the at least one community segment, the facilitator is a member of the at least community segment having permission to perform certain tasks within the computer system that other members do not have permission to perform;
enable the facilitator to attach a document and a survey to the at least one community segment assigned to the facilitator for directing the document and survey to members of the community;
enable the facilitator to provide functional tabs for navigational purposes into the at least one community segment assianed to the facilitator;
enable the facilitator to view a consolidated report of expert schedules and performance for the at least one community segment assigned to the facilitator; and
enable the facilitator to view consolidated metrics on the performance and activity of the at least one community segment assigned to the facilitator.

17. A system according to claim 16 wherein said server system is further configured to display related communities on a single, consolidated user interface on said client system.

18. A system according to claim 12 wherein said server system is further configured to prompt a permissioned user to attach at least one of a document and a survey into a community assigned to the permissioned user.

19. A system according to claim 12 wherein said server system is further configured to enable a permissioned user to define custom categories to further organize communities.

20. A system according to claim 12 wherein said server system is further configured to enable a permissioned user to secure specific information within a community such that said secured information is accessible by only authorized users.

21. A system according to claim 12 wherein said server system is further configured to prompt a permissioned user to provide functional tabs in a community assigned to the pennissioned user wherein said functional tabs are displayed on said client system for navigational purposes.

22. A system according to claim 13 wherein said server system is further configured to enable a permissioned user to transmit an electronic message to users of a community by attaching said electronic message to said user interface.

23. A system according to claim 12 wherein said client system and said server system are coupled via a network that includes one of a local area network, a wide area network, and intranet, and the Internet.

24. A computer program embodied on a computer readable medium for organizing information stored within a computer network-based system, said program comprising a code segment that receives information and then:
stores information in a database, said information includes documentation relating to a plurality of topics and a list of experts relating to a plurality of topics;
organizes information stored in the database;
aggregates related information stored within the database into a hierarchical data structure including a work function segment, a functional category segment and a community segment, wherein each work function segment includes at least one functional category seament and each functional category seament includes at least one community segment, and wherein each work function seament includes information relating to the corresponding work function, each functional category seament includes information relating to the corresponding functional category, and each community segment includes information relating to the corresponding community; and displays a user interface on a client system to enable a user to search the database for a specific item of information by the hierarchical data structure including at least one of work function, functional category, and community.

25. A computer program according to claim 24 further comprising a code segment that:

generates a plurality of reports including at least one of experts' schedules and performance, consolidated community metrics report, a monthly community metrics report, a consolidated community feedback report, a workflow form status report, and a case status report; and displays on said client system for a permissioned user said plurality of generated reports.

26. A computer program according to claim 24 further comprising a code segment that aggregates related information into the hierarchical data structure further including a business segment, a sub-business segment, and an office location segment.

27. A computer program according to claim 24 further comprising a code segment that:

assigns a facilitator to at least one community segment for maintaining information stored within the at least one community segment, the facilitator is a member of the at least community segment having permission to perform certain tasks within the computer system that other members do not have permission to perform;

enables the facilitator to attach a document and a survey to the at least one community segment assigned to the facilitator for directing the document and survey to members of the community;

enables the facilitator to provide functional tabs for navigational purposes into the at least onecommunity segment assigned to the facilitator;

enables the facilitator to view a consolidated report of expert schedules and performance for the at least one community segment assigned to the facilitator; and enables the facilitator to view consolidated metrics on the performance and activity of the at least one community segment assigned to the facilitator.

28. A computer program according to claim 24 further comprising a code segment that:

enables a permissioned user to attach at least one of a document and a survey into a community assigned to the permissioned user;

enables a permissioned user to define custom categories to further organize communities;

enables a permissioned user to secure specific information within a community such that said secured information is accessible by only authorized users; and enables a permissioned user to provide functional tabs in a community assigned to the permissioned user wherein said functional tabs are displayed on said client system for navigational purposes.

29. A computer program according to claim 24 further comprising a code segment that enables a permissioned user to transmit an electronic message to users of a community by attaching said electronic message to said user interface.

* * * * *